(12) United States Patent
Otani et al.

(10) Patent No.: US 11,093,085 B2
(45) Date of Patent: Aug. 17, 2021

(54) POSITION DETECTION METHOD, POSITION DETECTION DEVICE, AND INTERACTIVE PROJECTOR

(71) Applicant: SEIKO EPSON CORPORATION, Tokyo (JP)

(72) Inventors: Makoto Otani, Matsumoto (JP); Akira Ikeda, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/831,567

(22) Filed: Mar. 26, 2020

(65) Prior Publication Data
US 2020/0310590 A1  Oct. 1, 2020

(30) Foreign Application Priority Data

Mar. 27, 2019  (JP) .............................. JP2019-059591

(51) Int. Cl.
*G06F 3/042* (2006.01)
(52) U.S. Cl.
CPC .................. *G06F 3/0421* (2013.01)
(58) Field of Classification Search
CPC ......... G09G 3/2092; G09G 2310/0275; G09G 3/20; G06F 1/1626; G06F 1/1632; G06F 1/16; G06F 3/0425; G06F 3/0416; G06F 3/04883; G06F 2203/04101; G06F 2203/04808; G06F 3/04186; H05K 1/028; H05K 1/189; H05K 2201/10128; G06K 9/2036; G06K 9/00355
See application file for complete search history.

(56) References Cited

U.S. PATENT DOCUMENTS 9,436,998 B2 * 9/2016 Holz .......................... G06T 7/75
2015/0220213 A1 * 8/2015 Shamaie ............ G06K 9/00375
345/175

(Continued)

FOREIGN PATENT DOCUMENTS

JP      2001-194128 A    7/2001
JP      2009-008447 A    1/2009
(Continued)

*Primary Examiner* — Bryan Earles
(74) *Attorney, Agent, or Firm* — Oliff PLC

(57) ABSTRACT

A position detection method of detecting a position of a pointing element with respect to an operation surface includes: obtaining a first taken image by imaging the pointing element with the operation surface as a background using a monocular camera while performing illumination with a first illumination section without performing the illumination with a second illumination section at a position different from a position of the first illumination section; obtaining a second taken image by imaging the pointing element with the operation surface as the background using the camera while performing the illumination with the second illumination section without performing the illumination with the first illumination section; extracting pointing element and shadow areas from the first taken image and the second taken image; detecting a position of the pointing element with respect to the operation surface using a relationship between the pointing element area and the shadow area.

11 Claims, 20 Drawing Sheets

(56) References Cited

U.S. PATENT DOCUMENTS

2016/0266722 A1* 9/2016 Matsubara .............. G06F 3/042
2017/0329458 A1* 11/2017 Kanemaru ........... G06K 9/2036
2018/0091718 A1 3/2018 Kusumi et al.

FOREIGN PATENT DOCUMENTS

JP      2018-054412 A    4/2018
WO    2016/092617 A1    6/2016

* cited by examiner

POSITION DETECTION METHOD, POSITION DETECTION DEVICE, AND INTERACTIVE PROJECTOR The present application is based on, and claims priority from JP Application Serial Number 2019-059591, filed Mar. 27, 2019, the disclosure of which is hereby incorporated by reference herein in its entirety.

BACKGROUND

1. Technical Field

The present disclosure relates to a technology for detecting a position of a pointing element.

2. Related Art

In International Publication No. WO 2016/092617, there is disclosed a projector capable of projecting a projected screen on a screen, and at the same time taking an image including a pointing element such as a finger with a camera to detect the position of the pointing element using the taken image. The projector recognizes that a predetermined instruction such as drawing is input to the projected screen when the tip of the pointing element has contact with the screen, and then redraws the projected screen in accordance with the instruction. Therefore, it is possible for the user to input a variety of instructions using the projected screen as a user interface. The projector of the type capable of using the projected screen on the screen as a user interface capable of input as described above is referred to as an "interactive projector." Further, a screen surface as a surface used for the input of the instruction using the pointing element is also referred to as an "operation surface." The position of the pointing element is determined using triangulation using a plurality of images taken by a plurality of cameras.

However, in the related art, the pointing element and a shadow of the pointing element in the taken image are discriminated to detect the position of the pointing element. When the discrimination between the pointing element and the shadow of the pointing element is insufficient, there is a problem that the detection accuracy of the position of the pointing element with respect to the operation surface is not necessarily sufficient due to the influence of the shadow.

SUMMARY

According to an aspect of the present disclosure, there is provided a position detection method of detecting a position of a pointing element with respect to an operation surface. The position detection method includes (a) obtaining a first taken image by imaging the pointing element with the operation surface as a background using a monocular camera while performing illumination with a first illumination section without performing the illumination with a second illumination section disposed at a position different from a position of the first illumination section, (b) obtaining a second taken image by imaging the pointing element with the operation surface as the background using the monocular camera while performing the illumination with the second illumination section without performing the illumination with the first illumination section, (c) extracting a pointing element area as an area of the pointing element including a tip part of the pointing element and a shadow area as an area of a shadow of the pointing element from the first taken image and the second taken image obtained with the monocular camera, and (d) detecting a position of the pointing element with respect to the operation surface using a relationship between the pointing element area and the shadow area.

The present disclosure can be realized in a variety of aspects other than the position detection method such as a position detection device or an interactive projector, a computer program for realizing the method or a function of the device thereof, or a nonvolatile recording medium or the like storing the computer program.

DESCRIPTION OF EXEMPLARY EMBODIMENTS

A. First Embodiment

Figure 1:
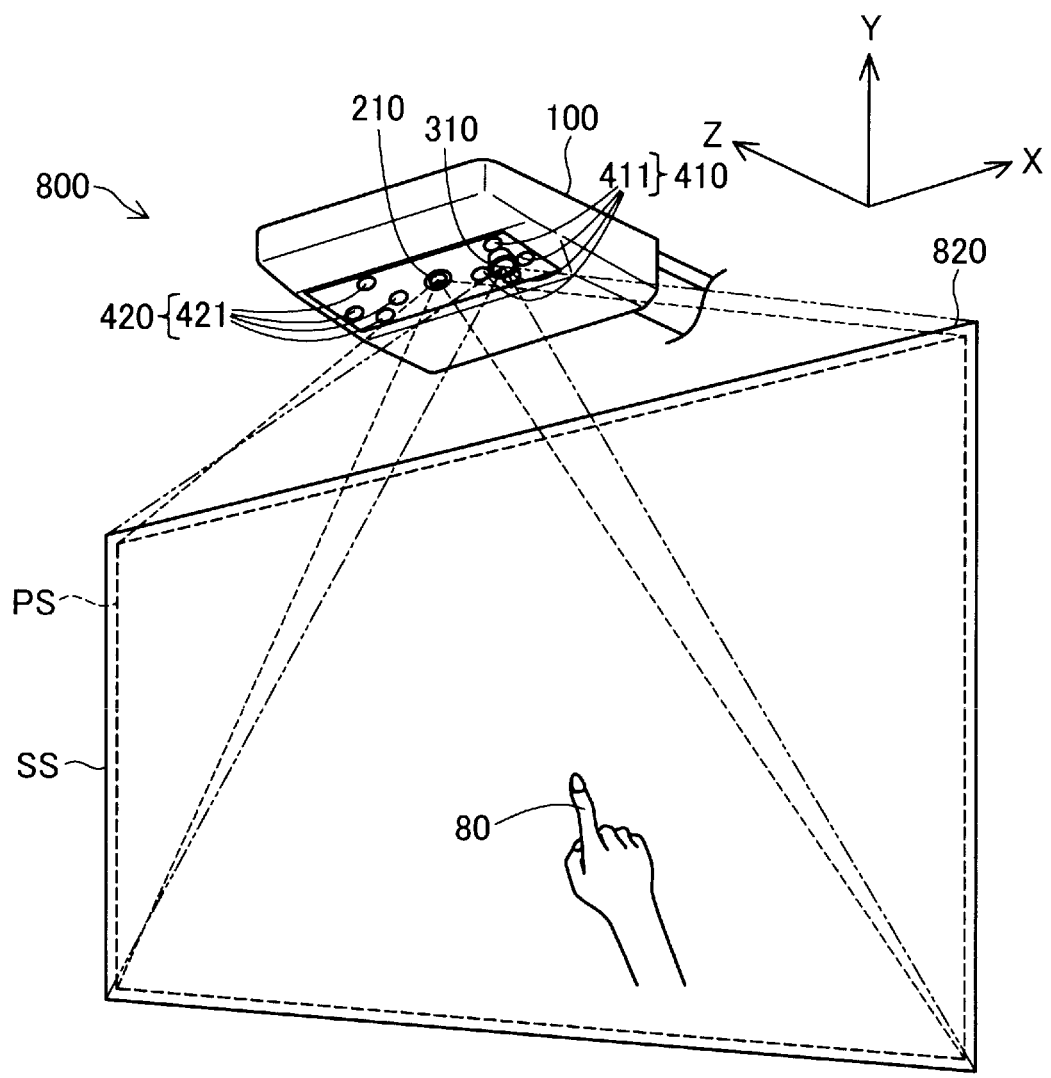
FIG. 1 is a perspective view of an interactive projection system according to a first embodiment.

FIG. 1 is a perspective view of an interactive projection system 800 in a first embodiment. The system 800 has an interactive projector 100 and a screen plate 820. A front surface of the screen plate 820 is used as an operation surface SS to be used for inputting an instruction using a pointing element 80. The operation surface SS is also used as a projection surface on which a projected screen PS is projected. The projector 100 is fixed to a wall surface or the like, and is installed in front of and above the screen plate 820. It should be noted that although the operation surface SS is vertically arranged in FIG. 1, it is also possible to use the system 800 with the operation surface SS arranged horizontally. In FIG. 1, the frontward direction of the screen plate 820 is a Z direction, the upward direction is a Y direction, and the rightward direction is an X direction. For example, assuming that Z=0 is true, the position in a plane of the operation surface SS can be detected in the two-dimensional coordinate system (X, Y).

The projector 100 has a projection lens 210 for projecting an image on the screen plate 820, a monocular camera 310 for taking the image including the pointing element 80, and a first illumination section 410 and a second illumination section 420 for emitting the infrared light for detecting the pointing element 80.

The projection lens 210 projects the projected screen PS on the operation surface SS. The projected screen PS includes an image drawn inside the projector 100. When the image drawn inside the projector 100 does not exist, the projector 100 irradiates the projected screen PS with light to display a white image. In the present specification, the "operation surface SS" means a surface used for inputting an instruction using the pointing element 80. Further, the "projected screen PS" means an area of an image projected on the operation surface SS by the projector 100.

In this interactive projection system 800, it is possible to use at least one pointing element 80 of a non-light emitting type. As the pointing element 80, it is possible to use a non-light emitting object such as a finger or a pen. Further, it is preferable for a tip part for pointing in the pointing element 80 of the non-light emitting type to be excellent in reflective property with respect to infrared light, and further have a retroreflective property.

The monocular camera 310 is set so as to be able to image the whole of the operation surface SS, and has a function of taking an image of the pointing element 80 with the operation surface SS as a background, and constitutes an imaging section. The monocular camera 310 is capable of taking an image in a specific wavelength range by installing a filter or the like. In other words, the monocular camera 310 receives the light reflected by the operation surface SS and the pointing element 80 out of the light emitted from the first illumination section 410 and the second illumination section 420 to thereby form the image including the pointing element 80. In the present embodiment, the first illumination section 410 and the second illumination section 420 emit the infrared light as the detection light, and thus, the monocular camera 310 takes the image of the infrared light. In this image, the pointing element 80 is detected as a bright point brighter than the operation surface SS. As the detection light, it is possible to use other light than infrared light. When using visible light as the detection light, it is preferable to configure the interactive projection system 800 so as not to degrade the display quality of the projected screen PS.

The first illumination section 410 has a function as an ambient illumination section for illuminating the periphery of the optical axis of the monocular camera 310 with the infrared light. In the example shown in FIG. 1, the first illumination section 410 includes four illumination elements 411 arranged so as to surround the periphery of the monocular camera 310. In the present embodiment, the first illumination section 410 is configured so as not to substantially generate a shadow of the pointing element 80 by the first illumination section 410 when taking the image of the pointing element 80 with the monocular camera 310. Here, the phrase "not to substantially generate the shadow" means that the shadow is light to the extent that the shadow of the pointing element 80 does not affect the process for detecting the position of the pointing element with respect to the operation surface of the pointing element 80 using the image. By providing the configuration described above to the first illumination section 410, the monocular camera 310 does not substantially image the shadow of the pointing element 80 existing between the operation surface SS and the monocular camera 310 on the operation surface SS.

The number of the illumination elements 411 constituting the first illumination section 410 is not limited to four, but can also be set as an arbitrary number no smaller than two. It should be noted that it is preferable for the plurality of illumination elements 411 constituting the first illumination section 410 to be disposed at the positions rotationally symmetric around the monocular camera 310. Further, instead of using the plurality of illumination elements 411, it is also possible to constitute the first illumination section 410 using an illumination element shaped like a ring. Further, it is also possible to arrange that a coaxial illumination section for emitting the light through a lens of the monocular camera 310 is used as the first illumination section 410.

The second illumination section 420 is disposed at a different position from that of the first illumination section 410, and includes the four illumination elements 421. It is sufficient for the second illumination section 420 to be able to emit the light toward the operation surface SS, and the number of the illumination elements can also be a number other than four.

Figure 2:
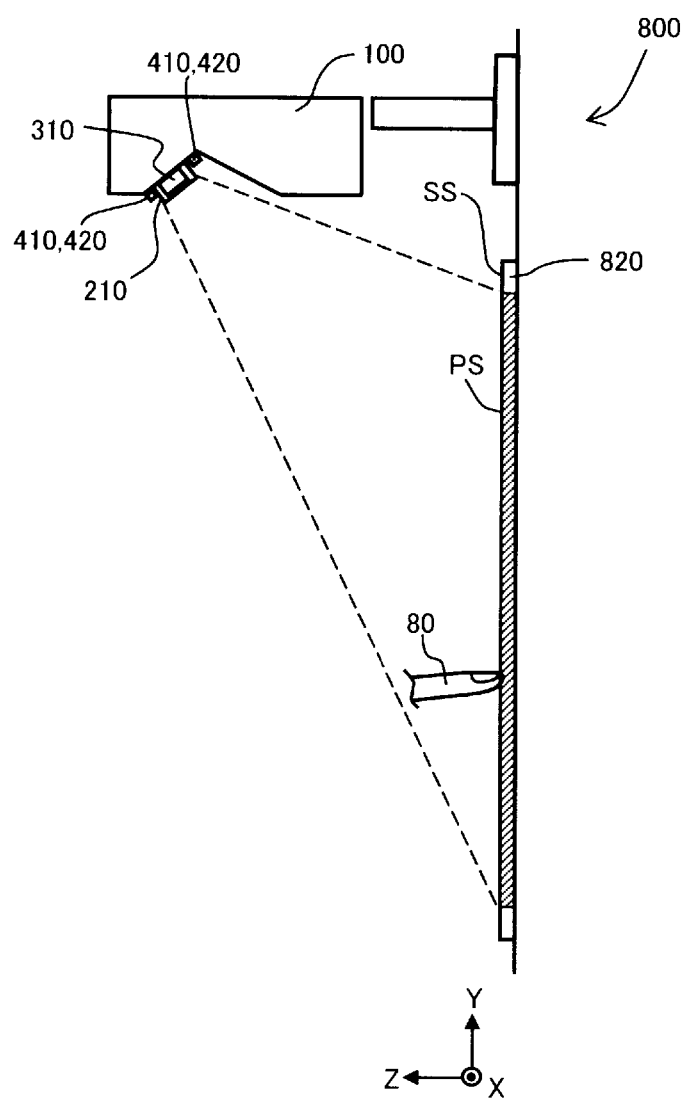
FIG. 2 is a side view of the interactive projection system.
Figure 3:
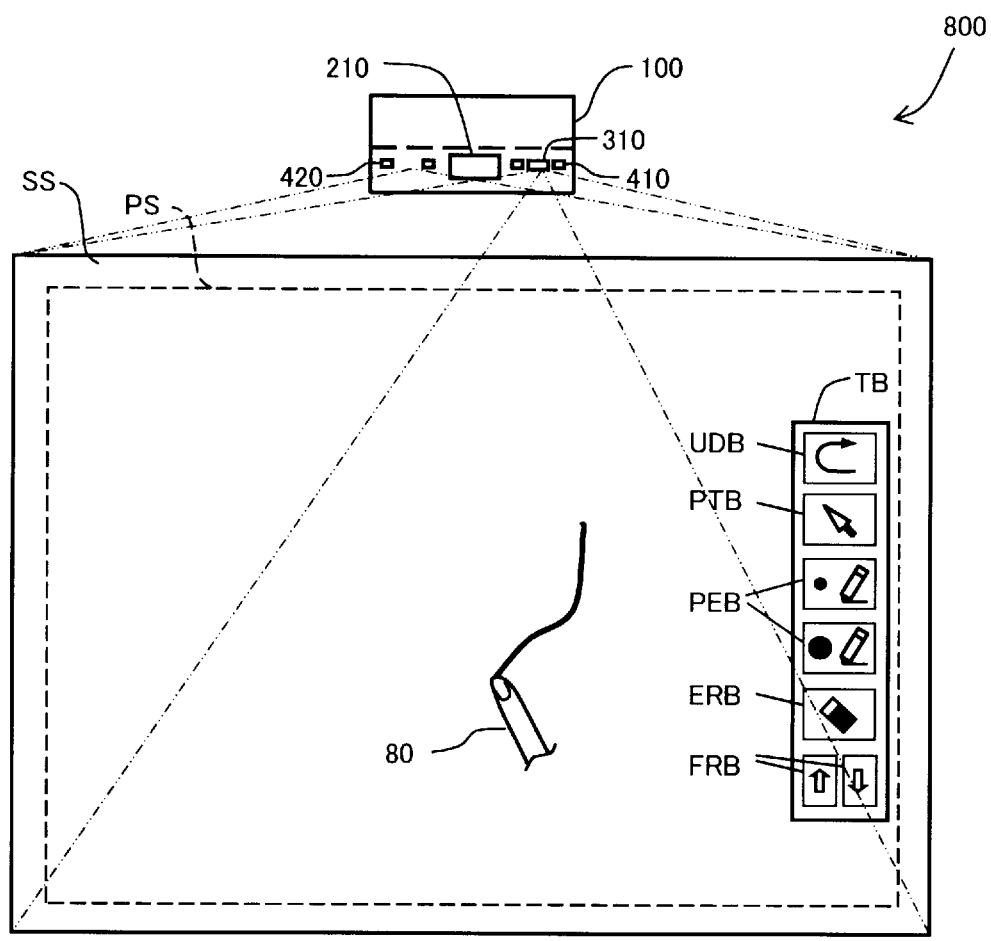
FIG. 3 is a front view of the interactive projection system.

FIG. 2 is a side view of the interactive projection system 800, and FIG. 3 is a front view thereof. In the present specification, a direction from a left end toward a right end of the operation surface SS is defined as an X direction, a direction from a lower end toward an upper end of the operation surface SS is defined as a Y direction, and a direction parallel to a normal line of the operation surface SS is defined as a Z direction. It should be noted that the X direction is also referred to as a "width direction," the Y direction is also referred to as an "upward direction," and the Z direction is also referred to as a "distance direction" for the sake of convenience. It should be noted that in FIG. 2, the range of the projected screen PS out of the screen plate 820 is provided with hatching for the sake of convenience of illustration. The coordinate position of the operation surface SS where the projected screen PS is projected can be detected as the two-dimensional coordinate of the two-dimensional coordinate system (X, Y) assuming, for example, Z=0 is true.

The example shown in FIG. 3 represents the state in which the interactive projection system 800 operates in a whiteboard mode. The whiteboard mode is a mode in which the user can arbitrarily draw a picture on the projected screen PS using the pointing element 80. The projected screen PS including a toolbox TB is projected on the operation surface SS. The toolbox TB includes a cancel button UDB for undoing the process, a pointer button PTB for selecting a mouse pointer, pen buttons PEB for selecting pen tools for drawing, an eraser button ERB for selecting an eraser tool for erasing the image having been drawn, and forward/backward buttons FRB for respectively feeding the screen forward and backward. By clicking these buttons using the pointing element 80, the user can perform processes corresponding to the respective buttons, or can select tools corresponding to the respective buttons. It should be noted that it is also possible to arrange that the mouse pointer is selected as a default tool immediately after starting up the system 800. In the example shown in FIG. 3, there is described the process in which the user selects the pen tool, and then moves the tip part of the pointing element 80 within the projected screen PS in the state of having contact with the operation surface SS to thereby draw a line in the projected screen PS. The drawing of the line is performed by a projection image generation section 500 described later.

It should be noted that the interactive projection system 800 can operate in other modes than the whiteboard mode. For example, this system 800 can also operate in a PC interactive mode for displaying an image represented by the data having been transferred from a personal computer not shown via a communication line in the projected screen PS. In the PC interactive mode, an image of the data of, for example, spreadsheet software is displayed, and it becomes possible to perform input, generation, correction, and so on of the data using a variety of tools and icons displayed in the image.

Figure 4:
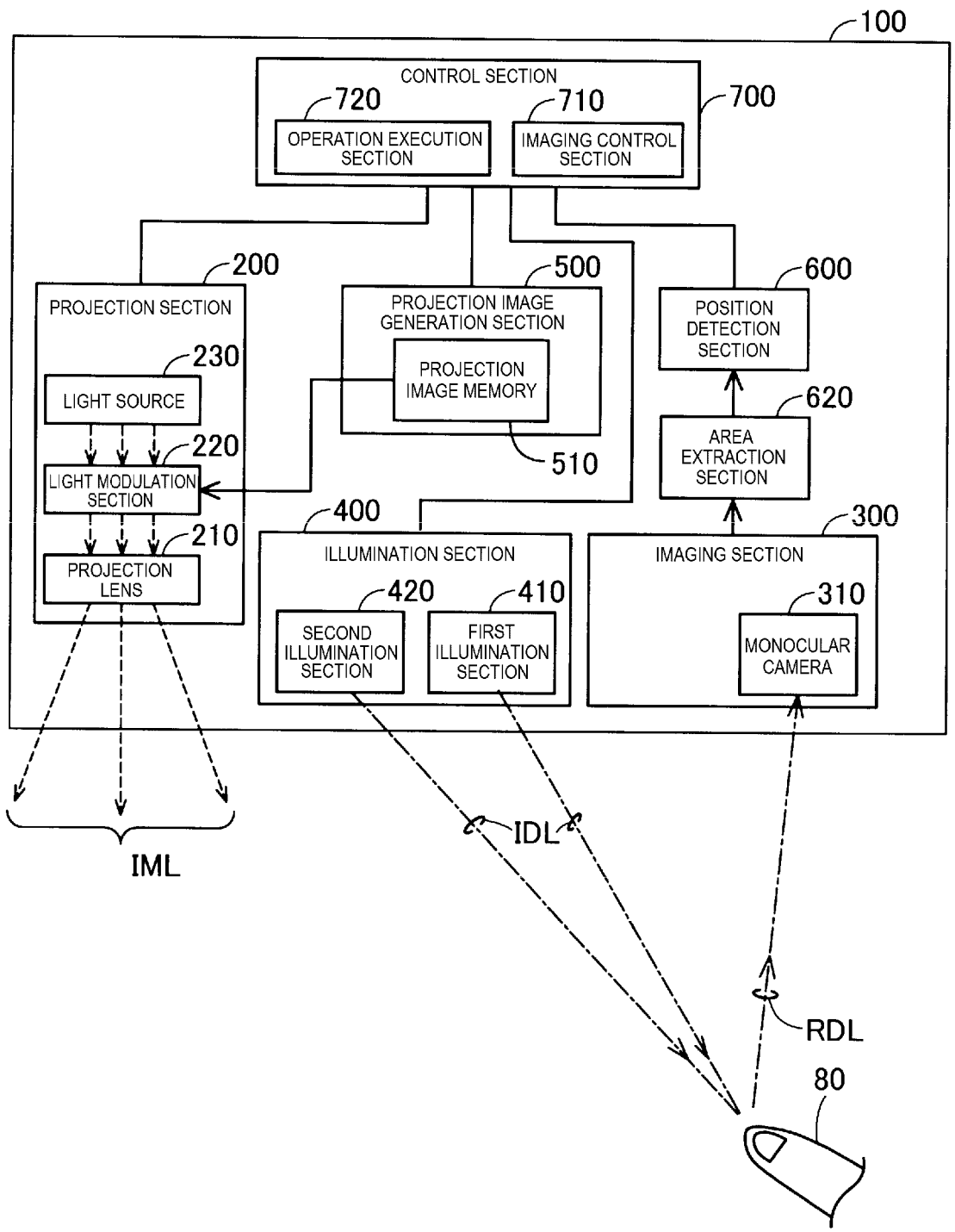
FIG. 4 is a functional block diagram of an interactive projector.

FIG. 4 is a functional block diagram of the interactive projector 100. The projector 100 has a control section 700, a projection section 200, the projection image generation section 500, an area extraction section 620, a position detection section 600, an imaging section 300, and an illumination section 400. The imaging section 300 includes the monocular camera 310, and the illumination section 400 includes the first illumination section 410 and the second illumination section 420.

The control section 700 performs control of each of the sections of the projector 100. Further, the control section 700 has a function as an imaging control section 710 for taking the image of the pointing element 80 using the imaging section 300 and the illumination section 400. Further, the control section 700 has a function as an operation execution section 720 for recognizing the content of the instruction having been made on the projected screen PS by the pointing element 80 detected by the position detection section 600, and at the same time commanding the projection image generation section 500 to generate or change the projection image in accordance with the content of the instruction. In the present embodiment, when the contact of the pointing element 80 with the operation surface SS is detected, the control section 700 recognizes that an instruction by the user has been performed.

The projection image generation section 500 has an image memory 510 for storing the projection image, and has a function of generating the projection image to be projected on the operation surface SS by the projection section 200. Further, the projection image generation section 500 also has a function of superimposing the drawing of a line and so on by the pointing element 80 on the projection image stored in the image memory 510. It is preferable for the projection image generation section 500 to be further provided with a function as a keystone distortion correction section for correcting a keystone distortion of the projected screen PS.

The projection section 200 has a function of projecting the projection image having been generated by the projection image generation section 500 on the operation surface SS. The projection section 200 has a light modulation section 220 and a light source 230 besides the projection lens 210 described with reference to FIG. 2. The light modulation section 220 modulates the light from the light source 230 in accordance with the projection image data provided from the image memory 510 to thereby form projection image light IML. The projection image light IML is typically color image light including visible light of three colors of RGB, and is projected on the operation surface SS by the projection lens 210. It should be noted that as the light source 230, there can be adopted a variety of types of light sources such as a light emitting diode or a laser diode besides a light source lamp such as a super-high pressure mercury lamp. Further, as the light modulation section 220, there can be adopted a transmissive or reflective liquid crystal panel, a digital mirror device, and so on, and there can also be adopted a configuration provided with a plurality of light modulation sections 220 for the respective colored light beams.

The illumination section 400 has the first illumination section 410 and the second illumination section 420 described with reference to FIG. 1. The first illumination section 410 and the second illumination section 420 are each capable of irradiating throughout the range from the operation surface SS to the space in front of the operation surface SS with irradiated detection light IDL for detecting the tip part of the pointing element 80. The irradiated detection light IDL is infrared light. As described later, the first illumination section 410 and the second illumination section 420 are each lit at an exclusive timing.

The imaging section 300 has the monocular camera 310 described with reference to FIG. 2. The monocular camera 310 has a function of receiving light in the wavelength region including the wavelength of the irradiated detection light IDL to thereby perform imaging. In the example shown in FIG. 4, there is described the condition in which the irradiated detection light IDL emitted by the illumination section 400 is reflected by the pointing element 80, and then the reflected detection light RDL is received by the monocular cameras 310 to be imaged.

The area extraction section 620 extracts a pointing element area as an area of the pointing element 80 including the tip part of the pointing element 80 and a shadow area of the shadow of the pointing element 80 from the image obtained by the monocular camera 310 performing imaging. The position detection section 600 detects the position of the pointing element 80 with respect to the operation surface SS using the relationship between the pointing element area and the shadow area thus extracted. The details of the functions of these sections will be described later.

A function of each part of the control section 700 and functions of the area extraction section 620 and the position detection section 600 are realized by, for example, a processor in the projector 100 executing a computer program. Further, it is also possible to realize a part of each of the functions of these sections with a hardware circuit such as an FPGA (field-programmable gate array).

Figure 5:
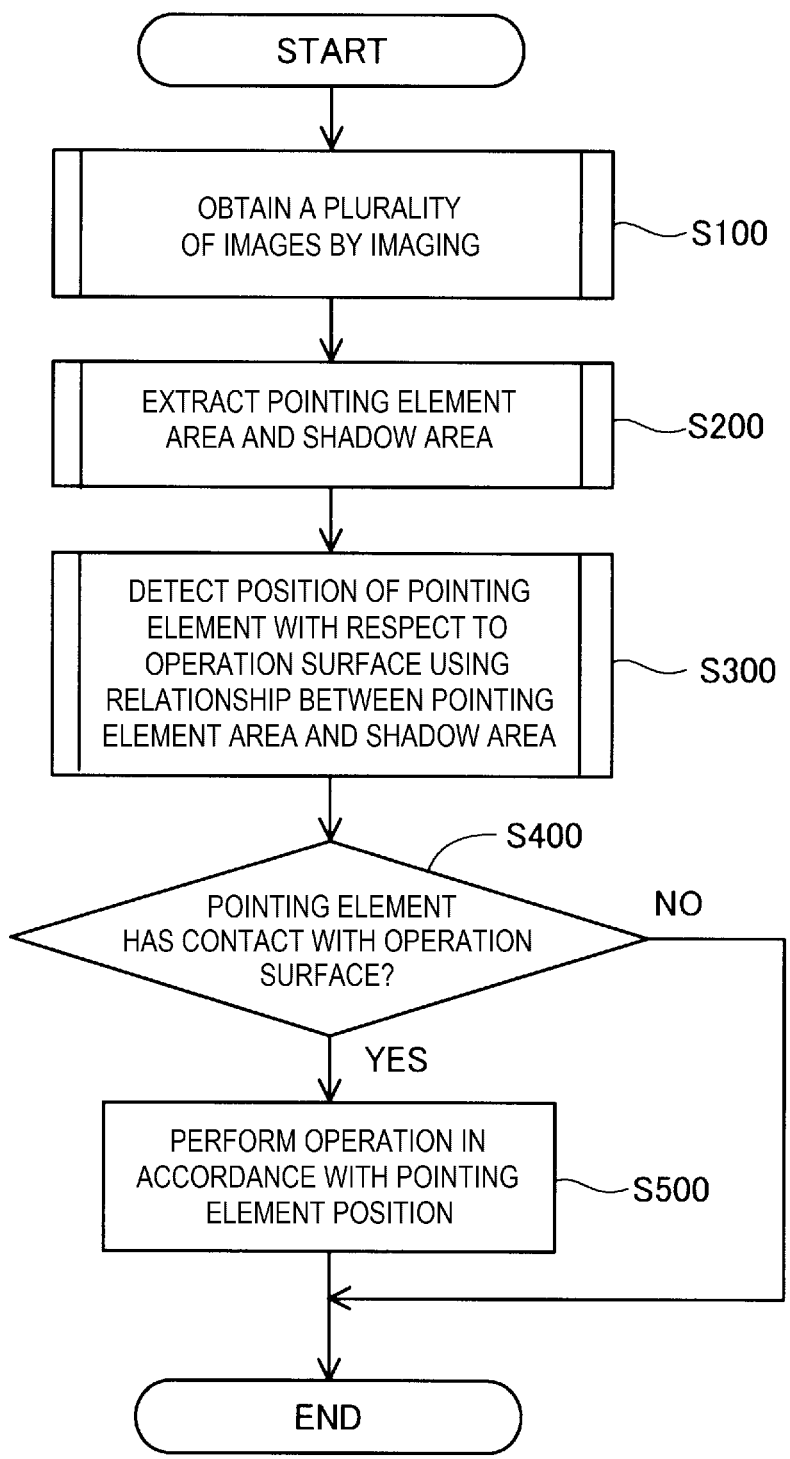
FIG. 5 is a flowchart showing a procedure of a position detection process.

FIG. 5 is a flowchart showing a procedure of the position detection process in the embodiment. This process is repeatedly performed during the operation of the interactive projection system 800. Before executing the position detection process, a calibration of the monocular camera 310 is performed.

In the step S100, by the imaging section 300 imaging the pointing element 80 with the operation surface SS as the background, a plurality of images taken by the monocular camera 310 is obtained.

Figure 6:
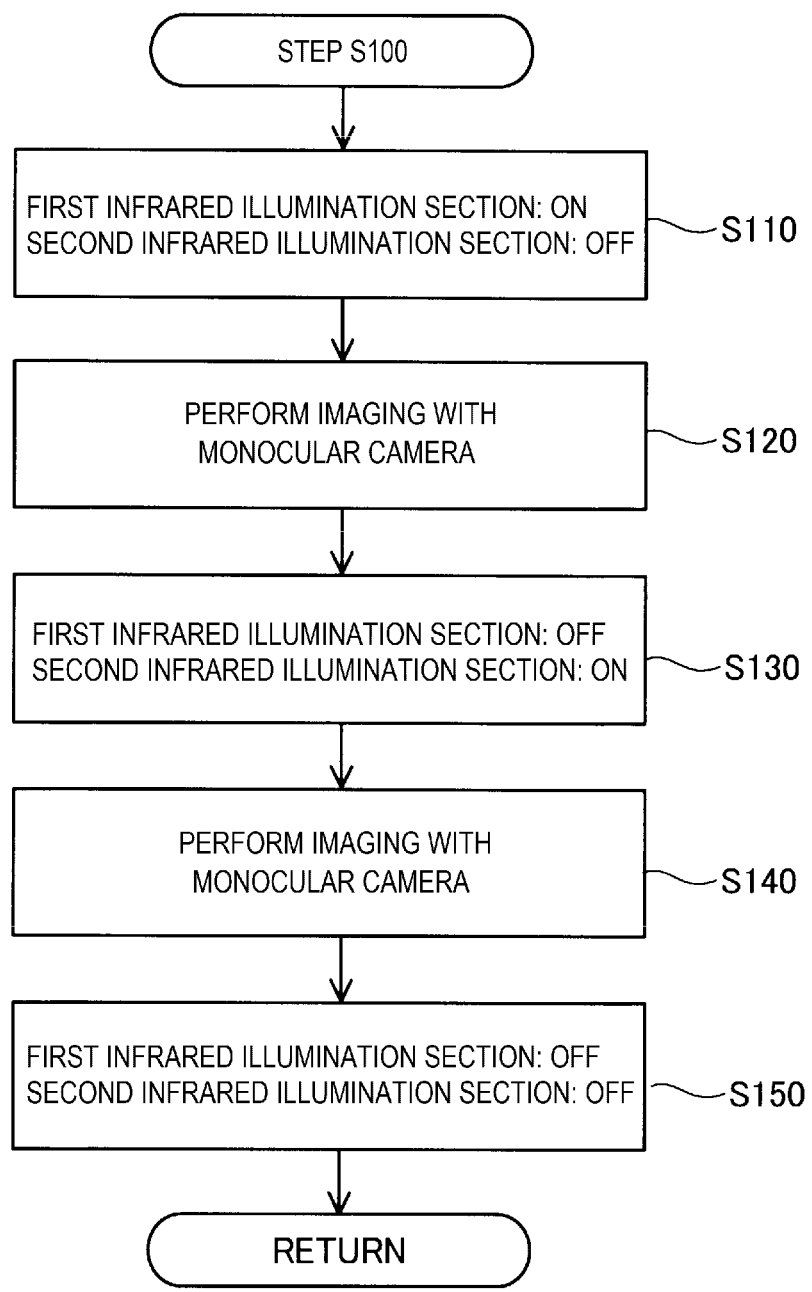
FIG. 6 is a flowchart showing a procedure of an imaging process in the step S100.
Figure 7:
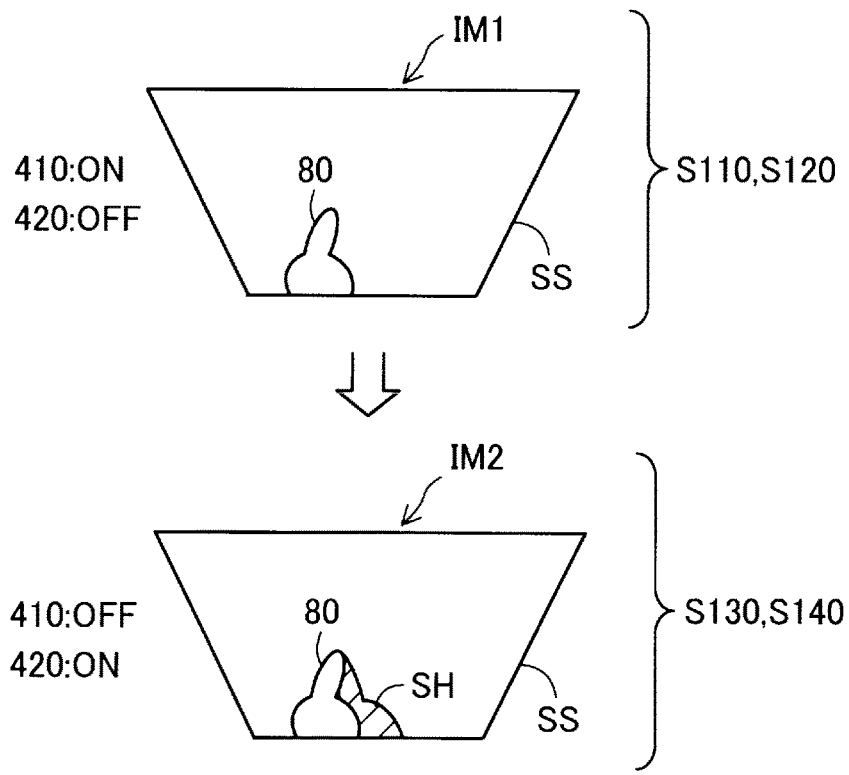
FIG. 7 is an explanatory diagram showing a content of the imaging process.

FIG. 6 is a flowchart representing a procedure of the imaging process in the step S100 shown in FIG. 5, and FIG. 7 is an explanatory diagram showing a content of the imaging process. The procedure shown in FIG. 6 is executed under the control by the imaging control section 710.

In the step S110, there is created the state in which the first illumination section 410 is in the ON state and the second illumination section 420 is in the OFF state. In the step S120, an image is taken using the monocular camera 310. As a result, a first taken image IM1 shown in an upper part of FIG. 7 is obtained. The first taken image IM1 is an image including the pointing element 80 with the operation surface SS as the background. As described with reference to FIG. 1, the first illumination section 410 is configured so as not to substantially generate the shadow of the pointing element 80 by the first illumination section 410 when taking the image of the pointing element 80 with the monocular camera 310. Therefore, the first taken image IM1 obtained in the step S120 does not substantially include the shadow of the pointing element 80.

In the step S130, there is created the state in which the first illumination section 410 is in the OFF state and the second illumination section 420 is in the ON state. As a result, a second taken image IM2 shown in a lower part of FIG. 7 is obtained. In the step S140, an image is taken using the monocular camera 310. The second taken image IM2 is also an image including the pointing element 80 with the operation surface SS as the background similarly to the first taken image IM1. As shown in FIG. 1, the second illumination section 420 is different from the first illumination section 410 disposed on the periphery of the monocular camera 310. Therefore, the second taken image IM2 obtained in the step S140 is an image obtained when putting off the first illumination section 410, and therefore, includes the shadow SH of the pointing element 80.

When the imaging in the step S120 and the step S140 ends, as shown in FIG. 7, the first taken image IM1 substantially lacking the shadow and the second taken image IM2 including the shadow SH taken by the monocular camera 310 are obtained. In the step S150, the first illumination section 410 and the second illumination section 420 are set to the OFF state to terminate the process in the step S100, and then wait until the subsequent imaging. It should be noted that the step S150 can be omitted. Further, it is also possible to arrange that the process in FIG. 6 is resumed immediately after the process in FIG. 6 is terminated.

When the process in the step S100 is terminated, in the step S200 shown in FIG. 5, the pointing element area and the shadow area are extracted from the two images, namely the first taken image IM1 and the second taken image IM2, obtained in the step S100.

Figure 8:
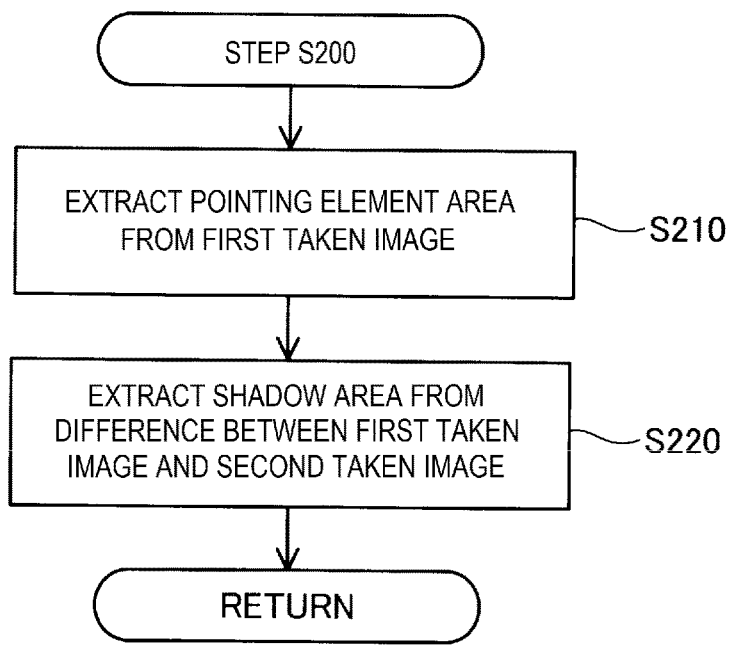
FIG. 8 is a flowchart showing a procedure of an extraction process in the step S200.
Figure 9:
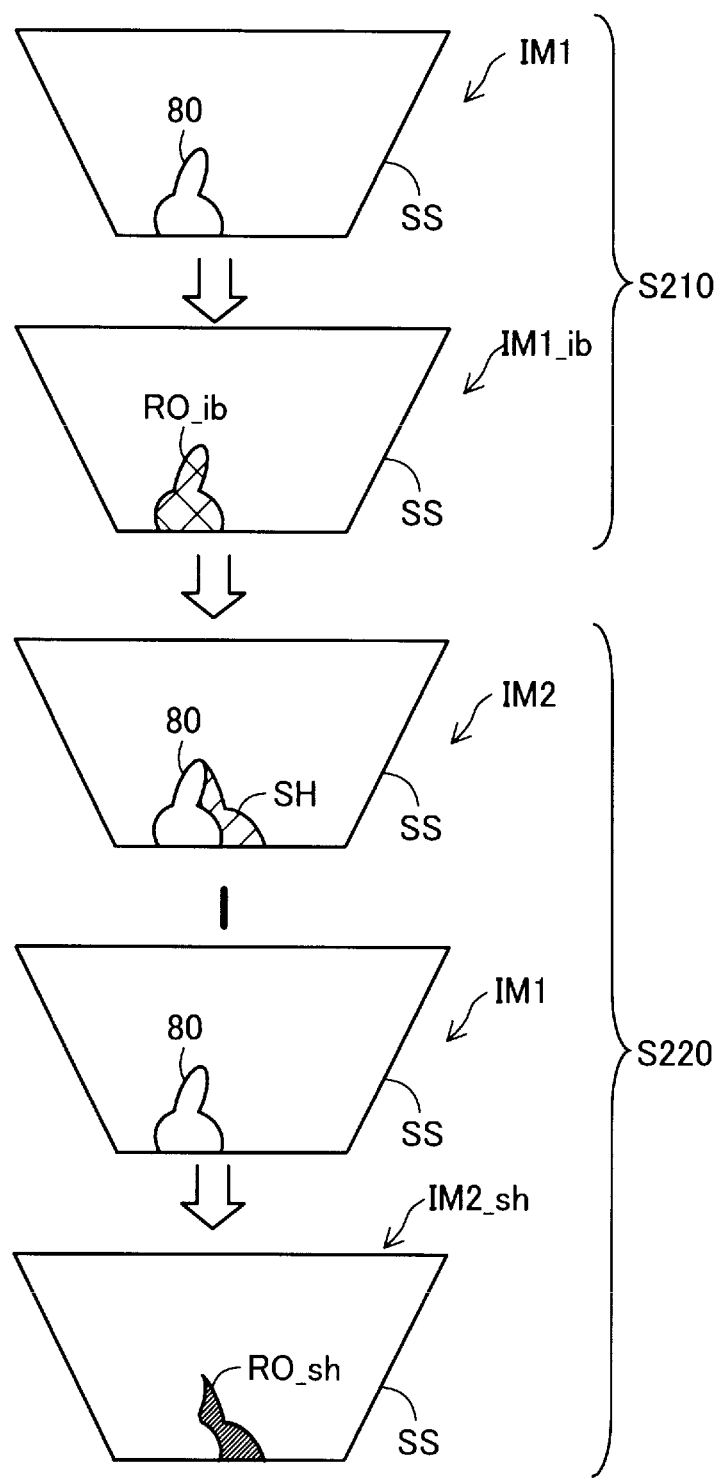
FIG. 9 is an explanatory diagram showing a content of the extraction process.

FIG. 8 is a flowchart representing a procedure of the extraction process in the step S200 shown in FIG. 5, and FIG. 9 is an explanatory diagram showing a content of the extraction process. The procedure shown in FIG. 8 is executed under the control by the area extraction section 620.

In the step S210, a pointing element area RO_ib is extracted from the first taken image IM1. The first taken image IM1 does not substantially include the shadow SH of the pointing element 80. Therefore, there is no need to consider a boundary between a shadow area RO_sh and the pointing element area RO_ib, and it is possible to accurately extract the pointing element area RO_ib from the first taken image IM1 using the image processing. As the image processing, there can be used a variety of types of known image processing such as edge detection including, for example, a background differencing technique, an average background differencing technique, binarization, morphological transformation, edge detection, and convex hull detection. On the second column from the top in FIG. 9, there is shown the pointing element area RO_ib in an image IM1_ib. The image IM1_ib is an image obtained by the image processing on the first taken image IM1.

In the step S220, the shadow area RO_sh is extracted from the difference between the first taken image IM1 and the second taken image IM2. The first taken image IM1 and the second taken image IM2 are images obtained by the same monocular camera 310. Therefore, the positions and the sizes of the pointing elements 80 appearing in the both images are the same. Therefore, it is possible to use the difference between the first taken image IM1 and the second taken image IM2 as the shadow area RO_sh. On the third column from the top in FIG. 9, there is shown a condition of obtaining the difference between the first taken image IM1 and the second taken image IM2, and on the lowermost column in FIG. 9, there is shown the shadow area RO_sh in a differential image IM2_sh between the first taken image IM1 and the second taken image IM2. Due to the process in the step S200, the position of the pointing element area RO_ib and the position of the shadow area RO_sh in the image with the operation surface SS as the background are identified. In the present embodiment, the position of the pointing element area RO_ib is identified by the image IM1_ib as the first taken image IM1 on which the image processing has been performed, and the position of the shadow area RO_sh is identified by the differential image IM2_sh.

When the process in the step S200 is terminated, the position of the pointing element 80 with respect to the operation surface SS is detected using the relationship between the pointing element area RO_ib and the shadow area RO_sh to determine whether or not the pointing element 80 has contact with the operation surface in the step S300 shown in FIG. 5.

Figure 10:
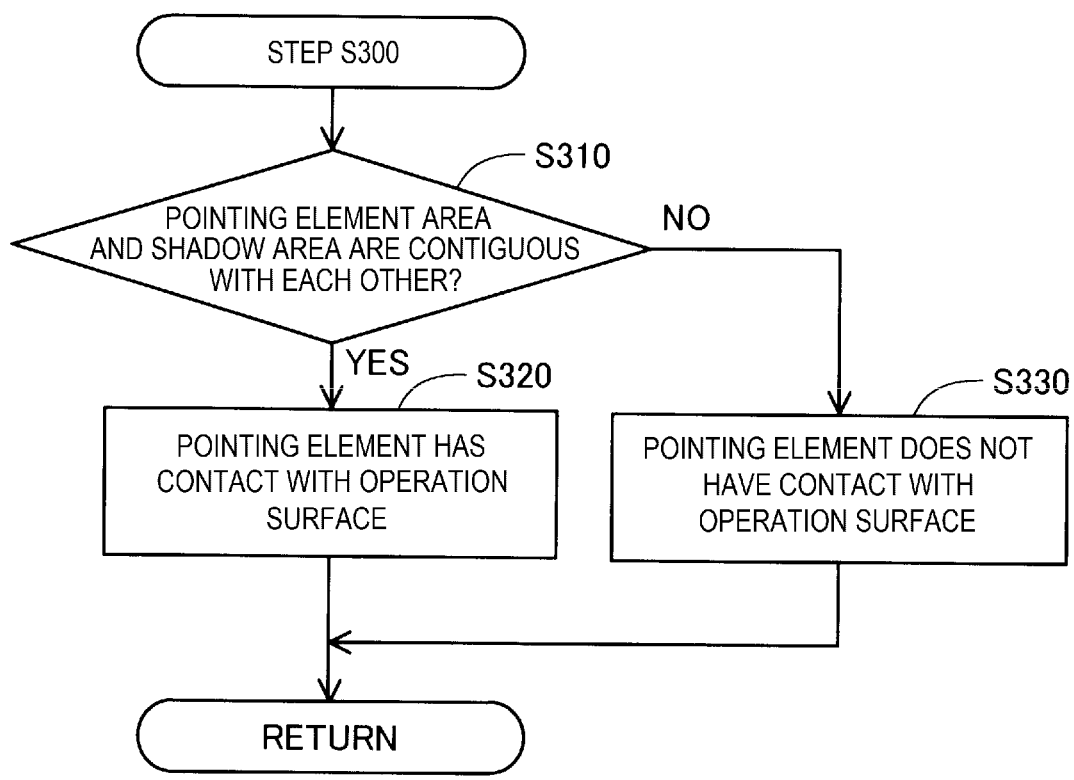
FIG. 10 is a flowchart showing a procedure of a determination process in the step S300.
Figure 11:
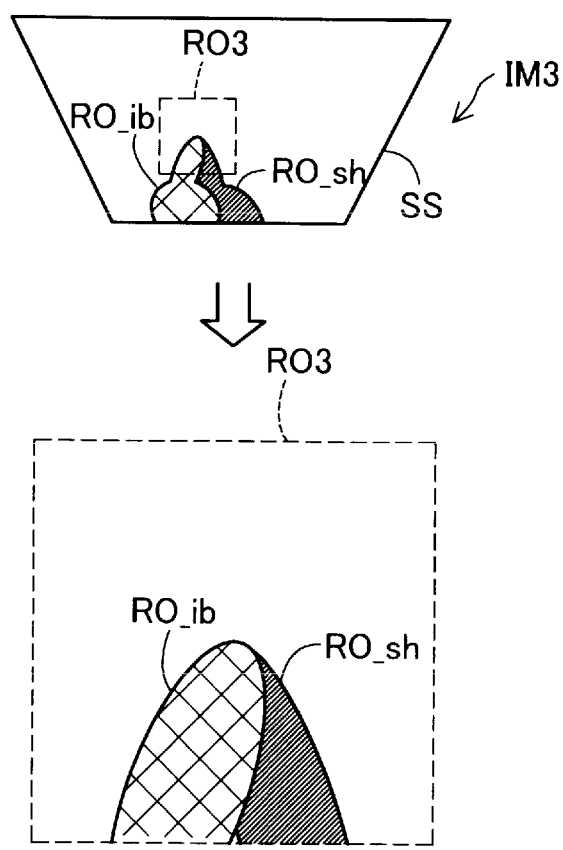
FIG. 11 is an explanatory diagram showing a content of the determination process.
Figure 12:
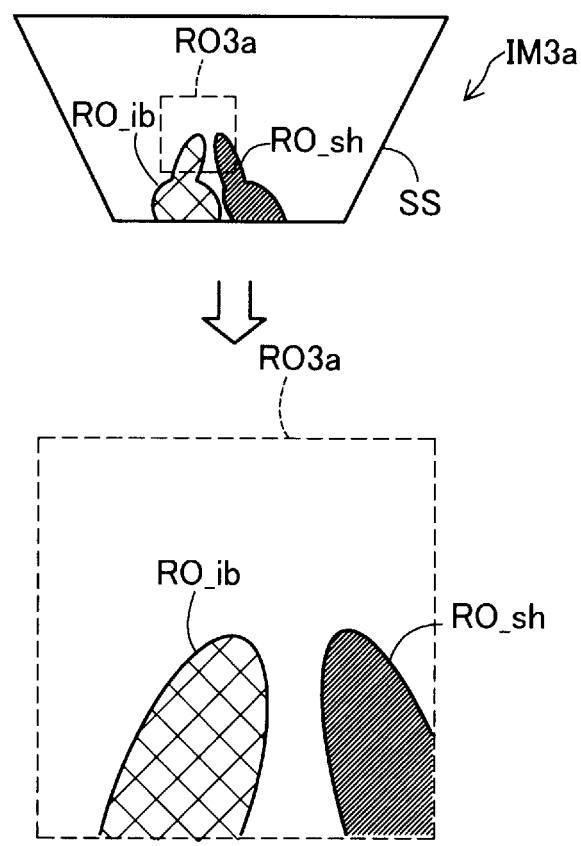
FIG. 12 is another explanatory diagram showing a content of the determination process.

FIG. 10 is a flowchart representing a procedure of a determination process in the step S300 shown in FIG. 5, and FIG. 11 and FIG. 12 are explanatory diagrams showing a content of the determination process in the step S300. The procedure shown in FIG. 10 is executed under the control by the position detection section 600.

In the step S310, there is determined whether or not the pointing element area RO_ib and the shadow area RO_sh are contiguous with each other. As described above, due to the extraction process in the step S200, the position of the pointing element area RO_ib and the position of the shadow area RO_sh in the image with the operation surface SS as the background are identified. As shown in FIG. 11, the position detection section 600 extracts an interested area RO3 including the tip part of the pointing element 80 from an arrangement image IM3 in which the pointing element area RO_ib and the shadow area RO_sh are arranged with the operation surface SS as the background. The interested area RO3 is, for example, an image of a square area centered on the tip part of the pointing element area RO_ib and having 100 through 300 pixels on a side. When the pointing element area RO_ib and the shadow area RO_sh in the interested area RO3 are contiguous with each other in the arrangement image IM3, the position detection section 600 proceeds to the step S320 to determine that the pointing element 80 has contact with the operation surface SS. The reason that such determination can be made is that when the pointing element 80 has contact with the operation surface SS, the pointing element 80 overlaps the shadow SH in the taken image obtained using the monocular camera 310 in the state in which the first illumination section 410 is in the OFF state. It should be noted that the phrase "the pointing element area RO_ib and the shadow area RO_sh are contiguous with each other" includes the fact that at least a part of the boundary of the pointing element area RO_ib and at least a part of the boundary of the shadow area RO_sh have contact with each other in the interested area RO3. Further, the phrase "the pointing element 80 has contact with the operation surface SS" means when the tip of the pointing element 80 is extremely close to the operation surface SS, and when the distance between the pointing element 80 and the operation surface SS is, for example, no larger than 3 through 5 mm.

When the pointing element 80 and the operation surface SS are separated from each other, the pointing element 80 and the shadow SH do not overlap with each other, and the pointing element area RO_ib and the shadow area RO_sh are not contiguous with each other in the image obtained using the monocular camera 310 in the state in which the first illumination section 410 is in the OFF state. In FIG. 12, there is shown an example of an arrangement image IM3a in which the pointing element area RO_ib and the shadow area RO_sh are arranged, and an interested area RO3a extracted from the arrangement image IM3a. In the example shown in FIG. 12, the pointing element area RO_ib and the shadow area RO_sh are not contiguous with each other in the interested area RO3a. In such a case, the process proceeds to the step S330 to determine that the pointing element 80 does not have contact with the operation surface SS. It should be noted that when the shadow area RO_sh does not exist in the interested area, it is determined that the pointing element area RO_ib and the shadow area RO_sh are not contiguous with each other.

In the present embodiment, since it is possible to determine that the pointing element 80 has contact with the operation surface SS when the pointing element area RO_ib and the shadow area RO_sh are contiguous with each other as described above, it is not required to calculate the three-dimensional position of the tip part of the pointing element 80 in order to determine whether or not the pointing element 80 has contact with the operation surface SS. It should be noted that the extraction of the interested areas RO3 and RO3a can be performed by the area extraction section 620.

In the step S400 shown in FIG. 5, when the pointing element 80 has contact with the operation surface SS, the process proceeds to the step S500, and the operation execution section 720 performs the operation corresponding to the tip position of the pointing element 80. When the pointing element 80 does not have contact with the operation surface SS, the position detection process is terminated.

As described above, in the first embodiment, by lighting each of the first illumination section 410 and the second illumination section 420 at the exclusive timing, it is possible to obtain the first taken image IM1 and the second taken image IM2 the same in the pointing element area RO_ib and different in the shadow area RO_sh. Therefore, it is possible to accurately extract the pointing element area RO_ib and the shadow area RO_sh using the first taken image IM1 and the second taken image IM2. Therefore, it is possible to accurately detect the position of the pointing element 80 with respect to the operation surface SS using the relationship between the pointing element area RO_ib and the shadow area RO_sh.

According to the first embodiment, since the first taken image IM1 does not substantially include the shadow SH of the pointing element 80, it is possible to simply extract the pointing element area RO_ib from the first taken image IM1. Further, it is possible to extract the shadow area RO_sh from the difference between the first taken image IM1 and the second taken image IM2. Therefore, since it is possible to more accurately extract the pointing element area RO_ib and the shadow area RO_sh, it is possible to more accurately detect the position of the pointing element 80 with respect to the operation surface SS.

According to the first embodiment, since the pointing element 80 overlaps the shadow SH in the taken image obtained using the monocular camera 310 when the pointing element 80 has contact with the operation surface SS, it is possible to accurately determine whether or not the pointing element 80 has contact with the operation surface SS based on whether or not the pointing element area RO_ib and the shadow area RO_sh are contiguous with each other. Further, it is possible to determine whether or not the pointing element 80 has contact with the operation surface SS without measuring the three-dimensional position of the pointing element 80.

B. Second Embodiment

Figure 13:
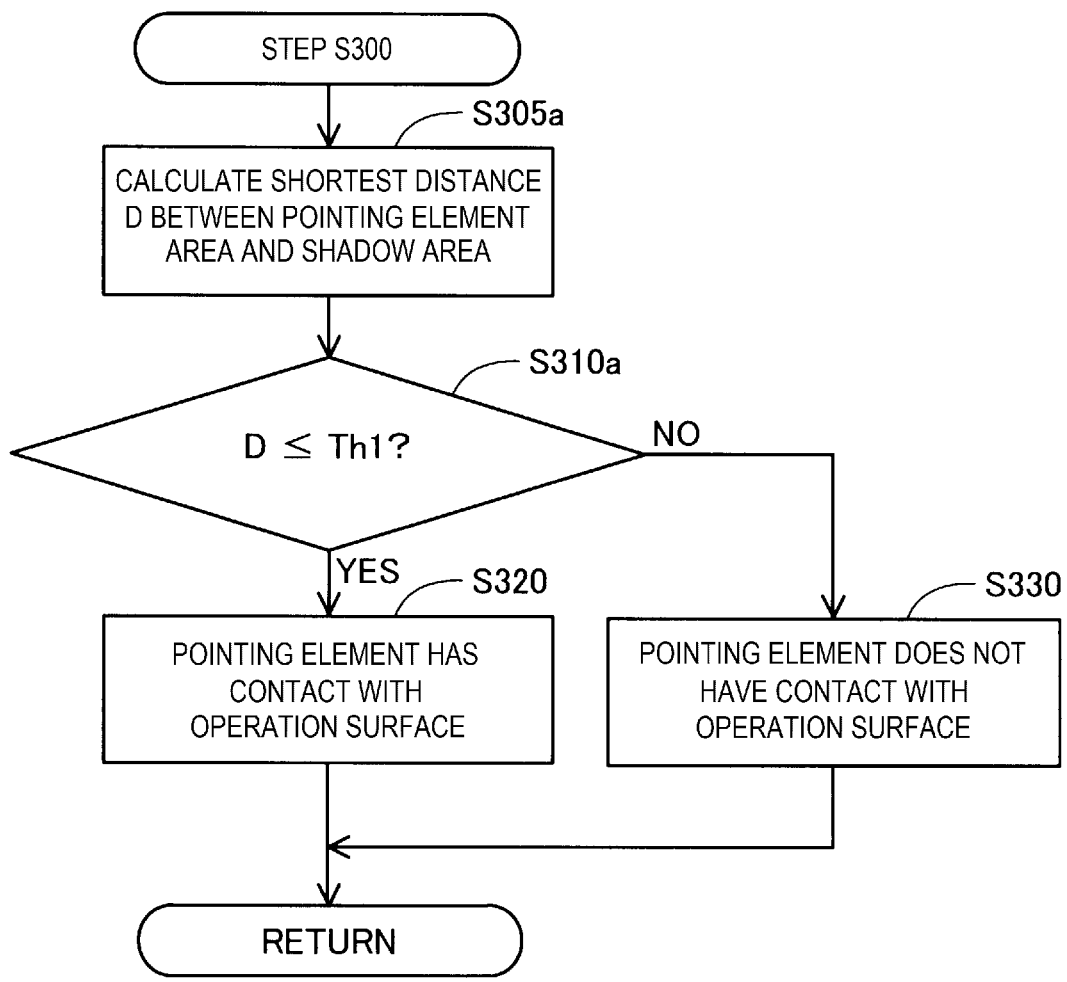
FIG. 13 is a flowchart showing a procedure of a determination process in a second embodiment.

FIG. 13 is a flowchart representing a procedure of the determination process in the step S300 shown in FIG. 5 in the second embodiment, and corresponds to FIG. 10 in the first embodiment. The second embodiment is obtained by replacing the step S310 shown in FIG. 10 with the step S305a and the step S310a, and the rest of the processing procedure and the device configuration are substantially the same as those of the first embodiment.

Figure 14:
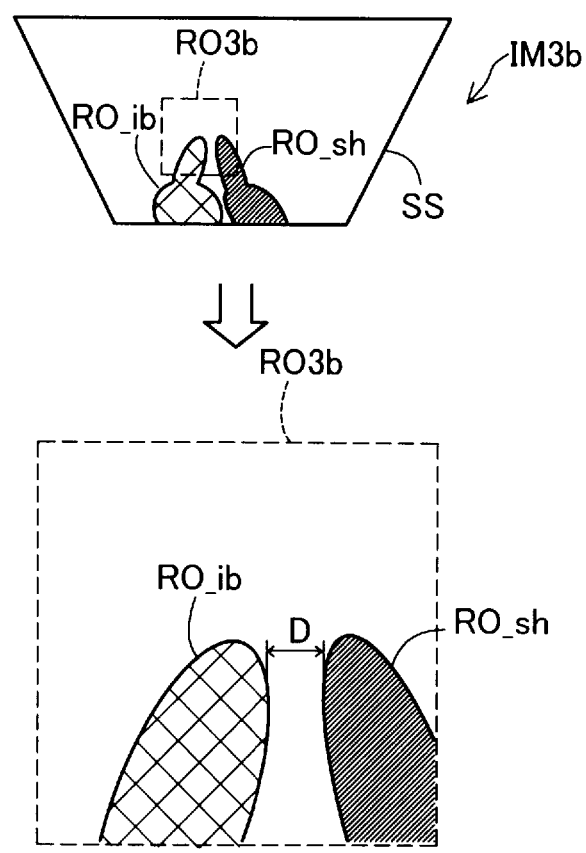
FIG. 14 is an explanatory diagram showing a content of the determination process in the second embodiment.

FIG. 14 is an explanatory diagram showing the content of the determination process. In the step S305a, the position detection section 600 extracts the interested area RO3b from the arrangement image IM3b in which the pointing element area RO_ib and the shadow area RO_sh are disposed with the operation surface SS as the background to calculate the shortest distance D between the pointing element area RO_ib and the shadow area RO_sh. When the shortest distance D is no larger than the predetermined threshold value Th1, the process proceeds to the step S320 to determine that the pointing element 80 has contact with the operation surface SS. When the shortest distance D is larger than the threshold value Th1, the process proceeds to the step S330 to determine that the pointing element 80 does not have contact with the operation surface SS. The threshold value Th1 can be obtained by obtaining the relationship between the shortest distance D between the pointing element area RO_ib and the shadow area RO_sh and the distance between the pointing element 80 and the operation surface SS by executing an experiment or simulation in advance.

As described above, when the pointing element 80 is separated from the operation surface SS, the pointing element 80 and the shadow SH are separated from each other in the taken image obtained using the monocular camera 310. Therefore, in the second embodiment, by determine whether or not the shortest distance D between the pointing element area RO_ib and the shadow area RO_sh is no larger than the threshold value Th1, it is possible to accurately determine whether or not the pointing element 80 has contact with the operation surface SS.

C. Third Embodiment

Figure 15:
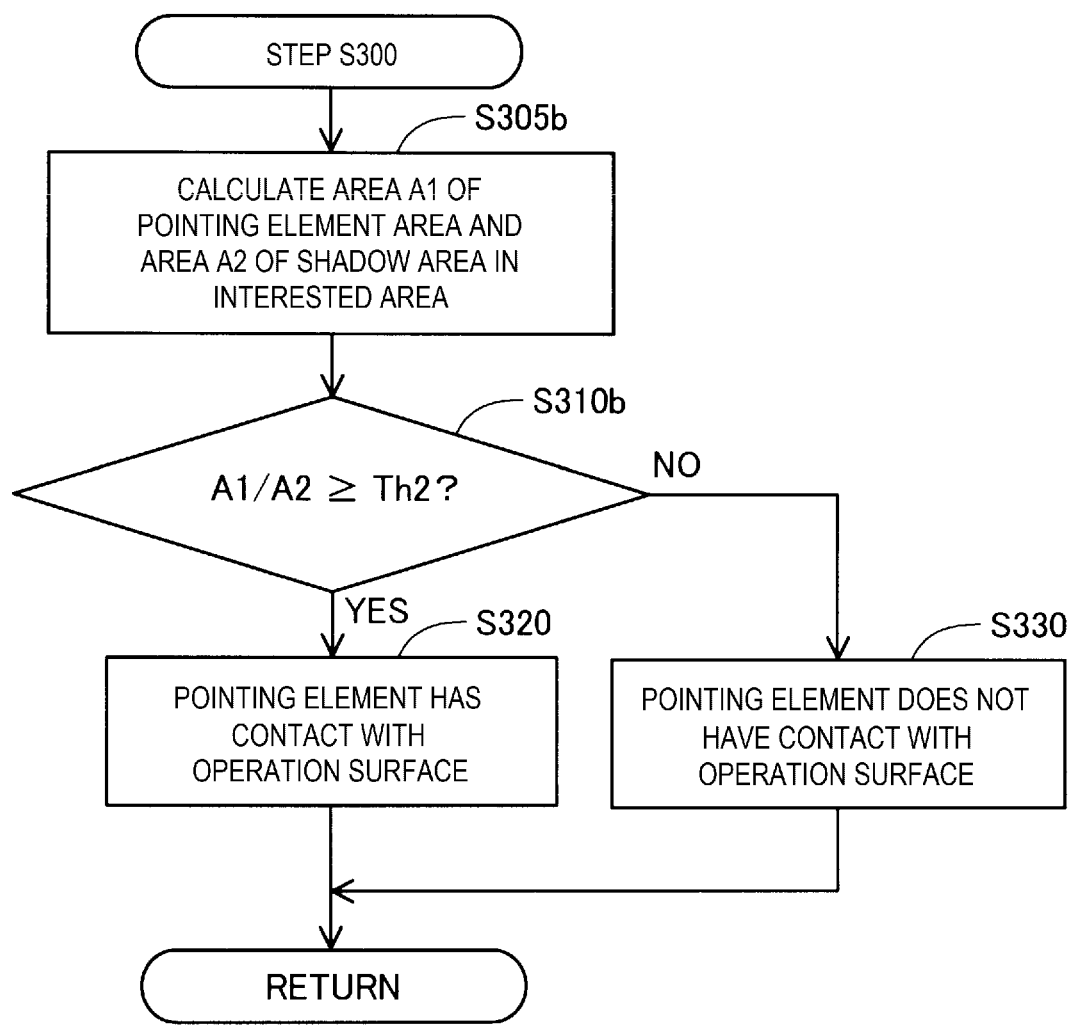
FIG. 15 is a flowchart showing a procedure of a determination process in a third embodiment.

FIG. 15 is a flowchart representing a procedure of the determination process in the step S300 shown in FIG. 5 in the third embodiment, and corresponds to FIG. 10 in the first embodiment. The third embodiment is obtained by replacing the step S310 shown in FIG. 10 with the step S305b and the step S310b, and the rest of the processing procedure and the device configuration are substantially the same as those of the first embodiment.

Figure 16:
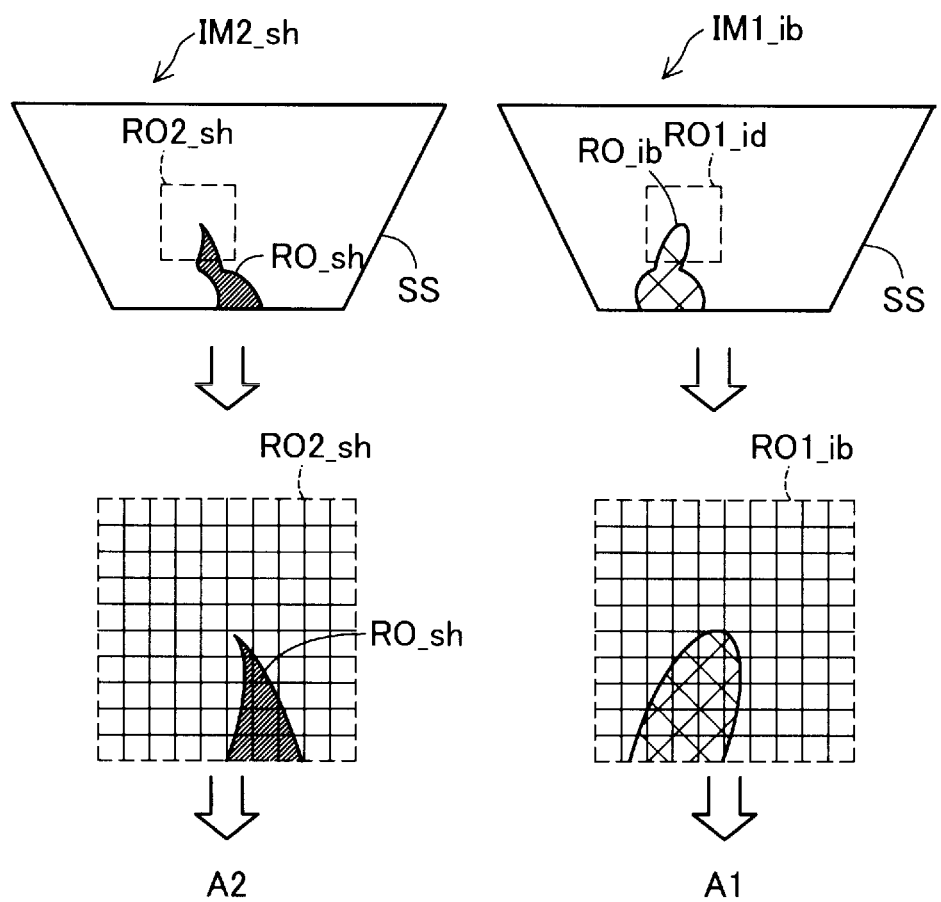
FIG. 16 is an explanatory diagram showing the determination process in the third embodiment.

FIG. 16 is an explanatory diagram showing the content of the determination process. On the right side of the upper part of FIG. 16, there is shown the image IM1_ib with the pointing element area RO_ib identified from the first taken image IM1 in the step S200 shown in FIG. 5. On the left side of the upper part of FIG. 16, there is shown the image IM2_sh which is a differential image between the first taken image IM1 and the second taken image IM2, and in which the shadow area RO_sh is identified. In the step S305b, the position detection section 600 extracts the interested area RO1_ib including the tip part of the pointing element area RO_ib from the image IM1_ib. Further, the position detection section 600 extracts the same position and range as those of the interested area RO1_ib from the image IM2_sh to extract the interested area RO2_sh. The position detection section 600 calculates the area A1 of the pointing element area RO_ib in the interested area RO1_ib and the area A2 of the shadow area RO_sh in the interested area RO2_sh to calculate a value (A1/A2) of a ratio of the area A1 to the area A2.

In the step S310b, when the value A1/A2 is no lower than a predetermined threshold value Th2, the process proceeds to the step S320 to determine that the pointing element 80 has contact with the operation surface SS. The reason that such determination can be made is that the shorter the distance between the pointing element 80 and the operation surface SS becomes, the more the pointing element 80 overlaps the shadow SH, and the larger the value A1/A2 becomes in the taken image obtained using the monocular camera 310 in the state in which the first illumination section 410 is in the OFF state. The threshold value Th2 can be obtained by obtaining the relationship between the value A1/A2 of the ratio of the area A1 of the pointing element area RO_ib to the area A2 of the shadow area RO_sh in the interested area and the distance between the pointing element 80 and the operation surface SS by executing an experiment or simulation in advance. When the value A1/A2 is lower than the threshold value Th2, the process proceeds to the step S330 to determine that the pointing element 80 does not have contact with the operation surface SS.

As described hereinabove, in the third embodiment, since the shorter the distance between the pointing element 80 and the operation surface SS becomes, the more the pointing element 80 overlaps the shadow SH, and therefore, the higher the value A1/A2 of the ratio of the area A1 of the pointing element area RO_ib to the area A2 of the shadow area RO_sh becomes, it is possible to accurately determine whether or not the pointing element 80 has contact with the operation surface SS using the value A1/A2. Further, it is possible to determine whether or not the pointing element 80 has contact with the operation surface SS without measuring the three-dimensional position of the pointing element 80.

D. Fourth Embodiment

Figure 17:
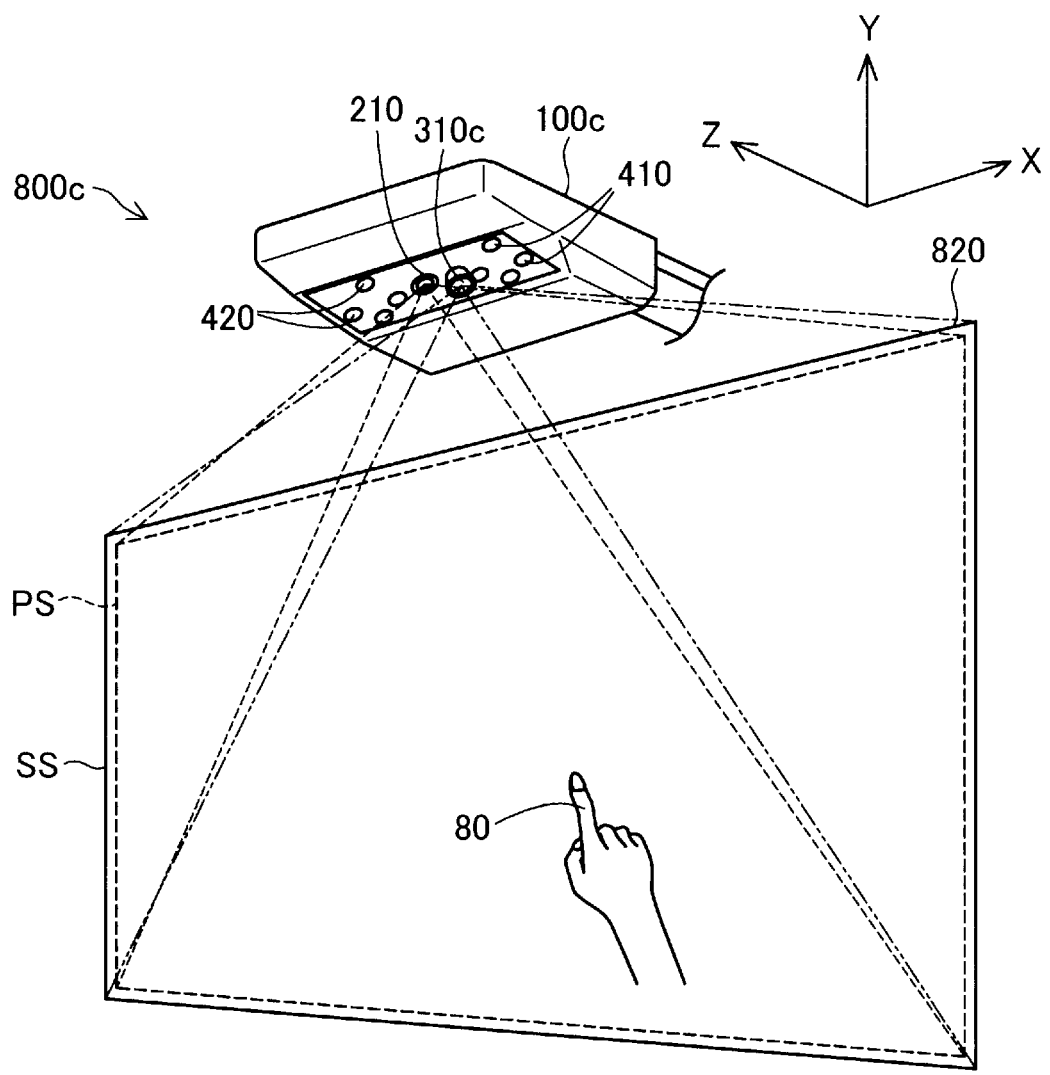
FIG. 17 is a perspective view of an interactive projection system according to a fourth embodiment.

FIG. 17 is a front view of a position detection system 800c according to a fourth embodiment. The interactive projector 100c in the position detection system 800c is different from the interactive projector according to the first embodiment mainly in the point that the monocular camera 310c is disposed between the first illumination section 410 and the second illumination section 420. In the present embodiment, the first illumination section 410 does not have a function as an ambient illumination section for illuminating the periphery of the optical axis of the monocular camera 310c with the infrared light.

Figure 18:
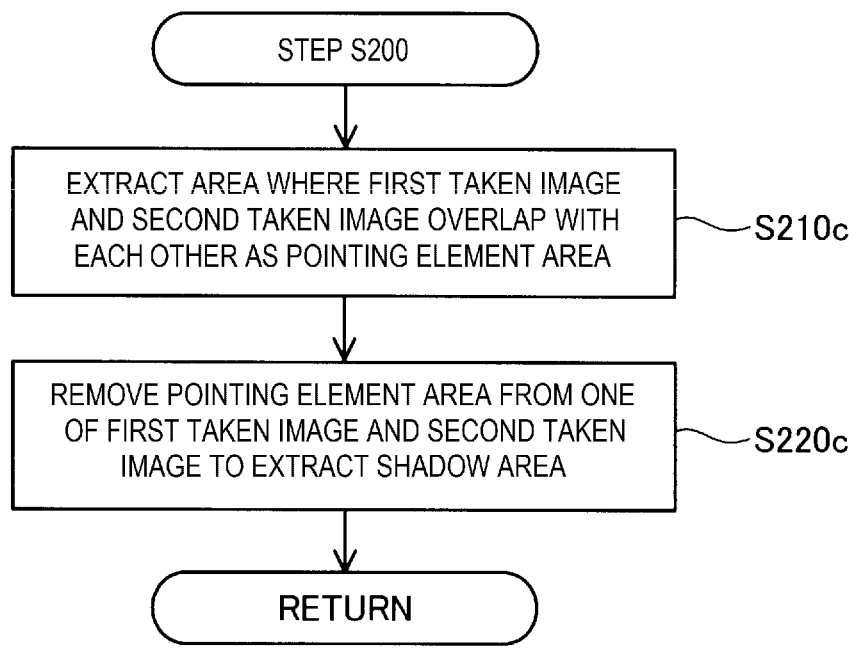
FIG. 18 is a flowchart showing a procedure of an extraction process in the fourth embodiment.

FIG. 18 is a flowchart representing a procedure of the extraction process in the step S200 shown in FIG. 5 in the fourth embodiment, and corresponds to FIG. 8 in the first embodiment. The fourth embodiment is obtained by replacing the steps S210 and S220 shown in FIG. 8 respectively with the step S210c and the step S220c, and the rest of the processing procedure and the device configuration are substantially the same as those of the first embodiment.

Figure 19:
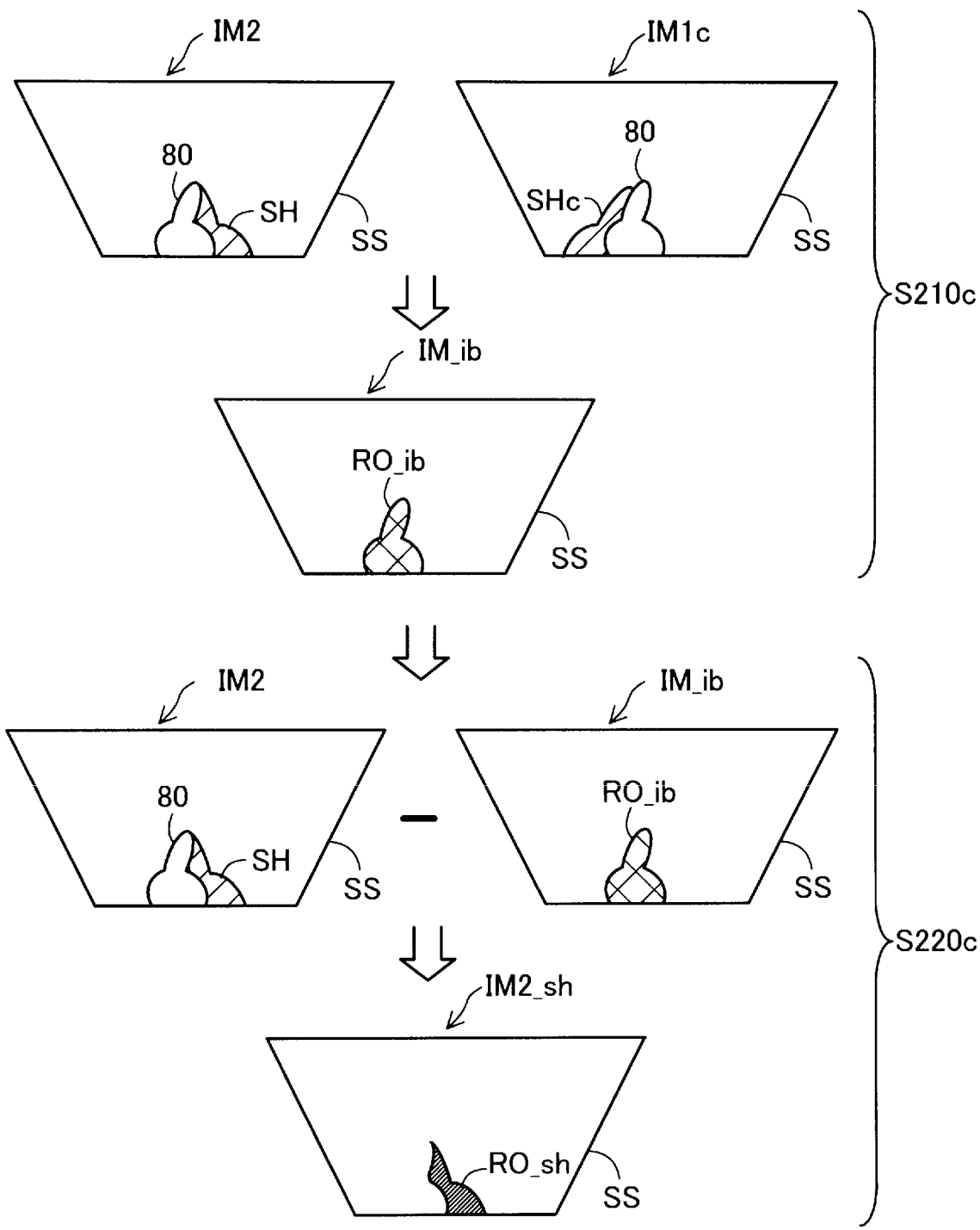
FIG. 19 is an explanatory diagram showing the extraction process in the fourth embodiment.

FIG. 19 is an explanatory diagram showing the contents of the extraction process in the fourth embodiment. On the right side of the upper part of FIG. 19, there is shown the first taken image IM1c obtained in the state in which the first illumination section 410 is in the ON state and the second illumination section 420 is in the OFF state. Unlike the first embodiment, the first taken image IM1c includes the shadow SHc of the pointing element 80. In the step S210c, the background as the part other than the pointing element 80 and the shadows SH and SHc is removed from the first taken image IM1c and the second taken image IM2 with the image processing to extract, as the pointing element area RO_ib, an area where the first taken image IM1c with the background removed and the second taken image IM2 with the background removed overlap with each other. The first taken image IM1c and the second taken image IM2 are images obtained by the same monocular camera 310c. Therefore, the positions and the sizes of the pointing elements 80 appearing in the both images are the same. Therefore, the area where the first taken image IM1c with the background removed and the second taken image IM2 with the background removed overlap with each other can be used as the pointing element area RO_ib. In the second column from the top in FIG. 19, there is shown the image IM_ib in which the pointing element area RO_ib is identified and the operation surface SS is used as the background.

In the step S220c, the shadow area RO_sh is extracted by removing the pointing element area RO_ib from one of the first taken image IM1c and the second taken image IM2. In the third column from the top in FIG. 19, there is shown a process of removing the pointing element area RO_ib from the second taken image IM2, and in the fourth column from the top in FIG. 19, there is shown the image IM2_sh in which the pointing element area RO_ib is identified and the operation surface SS is used as the background.

According to the fourth embodiment, similarly to the first embodiment, by lighting each of the first illumination section 410 and the second illumination section 420 at the exclusive timing, it is possible to obtain the first taken image IM1c and the second taken image IM2 the same in the pointing element area RO_ib and different in the shadow area RO_sh. Therefore, it is possible to accurately extract the pointing element area RO_ib and the shadow area RO_sh using the first taken image IM1c and the second taken image IM2. Therefore, it is possible to accurately detect the position of the pointing element 80 with respect to the operation surface SS using the relationship between the pointing element area RO_ib and the shadow area RO_sh.

E. Fifth Embodiment

Figure 20:
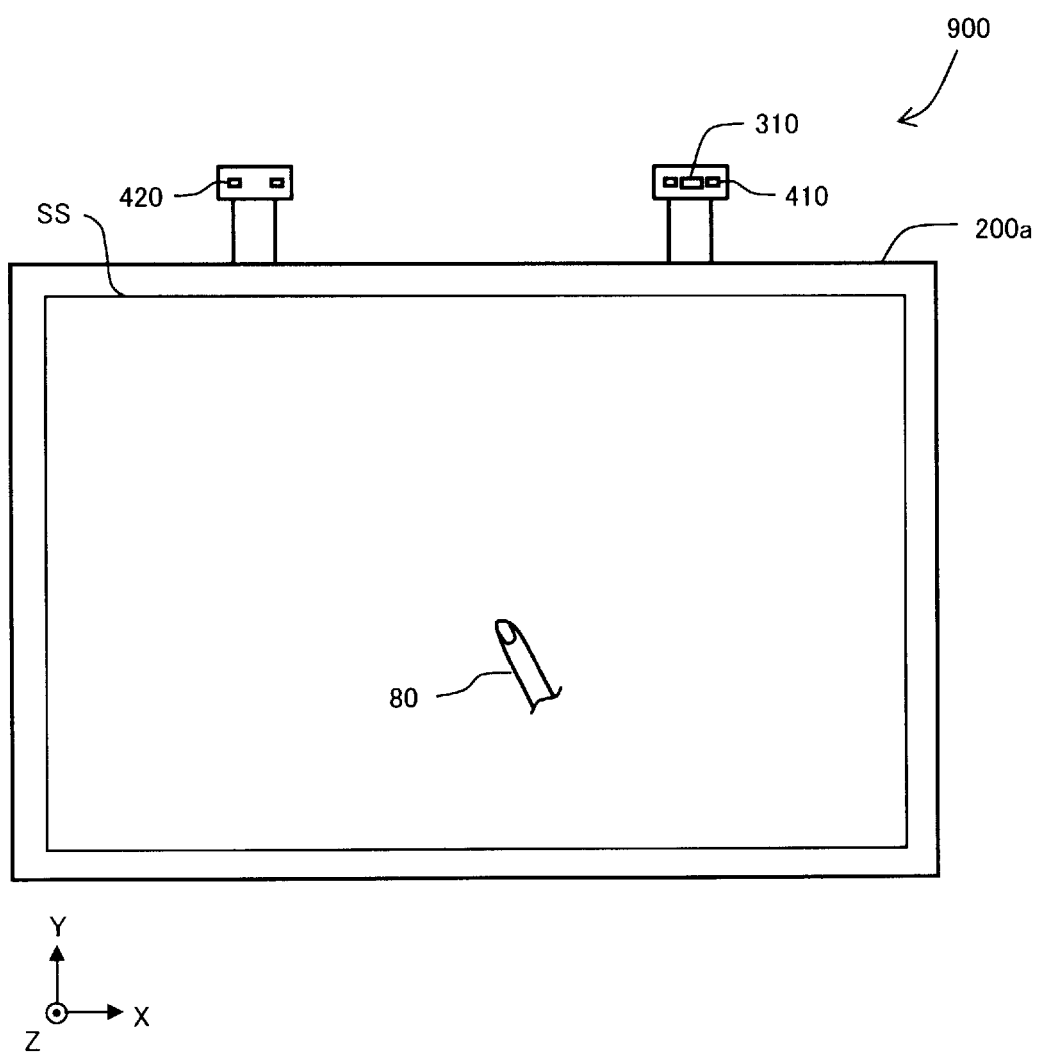
FIG. 20 is a front view of a position detection system in a fifth embodiment.

FIG. 20 is a front view of a position detection system 900 in a fifth embodiment. The position detection system 900 has an image display panel 200a, the monocular camera 310 for taking the image including the pointing element 80, and the first illumination section 410 and the second illumination section 420 for emitting the light for detecting the pointing element 80. The configuration of the monocular camera 310, the first illumination section 410, and the second illumination section 420 is the same as the configuration of these constituents in the first embodiment. The image display panel 200a is a so-called flat panel display. The image display surface of the image display panel 200a corresponds to the operation surface SS.

Figure 21:
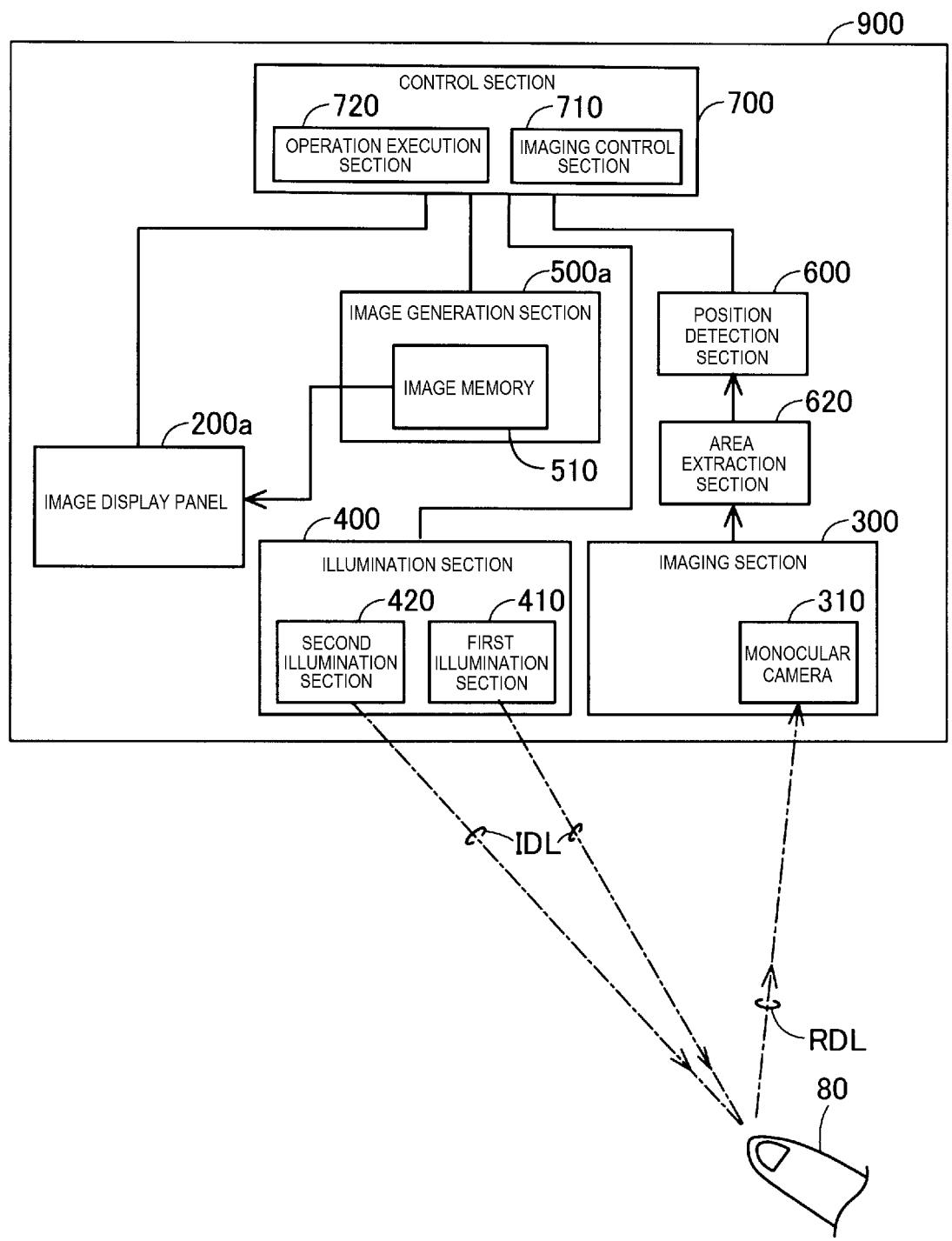
FIG. 21 is a functional block diagram of the position detection system in the fifth embodiment.

FIG. 21 is a functional block diagram of the position detection system 900. The position detection system 900 is obtained by changing the projection section 200 to the image display panel 200a, and the projection image generation section 500 to an image generation section 500a out of the constituents of the interactive projector 100 shown in FIG. 4, and the rest of the constituents are the same as those of the interactive projector 100. Further, the position detection process by the position detection system 900 is substantially the same as the process in the first embodiment described with reference to FIG. 10 through FIG. 12, and therefore, the description will be omitted. The fifth embodiment also exerts substantially the same advantages as in the first embodiment.

F. Other Embodiments

In the embodiments described above, the illumination section 400 is provided with two illumination devices, namely the first illumination section 410 and the second illumination section 420. In contrast, it is also possible for the illumination section 400 to be provided with three or more illumination devices arranged at respective positions different from each other. In other words, defining N as an integer no smaller than three, it is possible to arrange to dispose N illumination devices. In this case, each of the illumination device is selected in sequence, and imaging is performed using the monocular cameras 310 and 310c while performing the illumination with the selected illumination device without performing the illumination with the illumination devices not selected to thereby obtain N taken images in sequence one by one at respective timings different from each other. It is possible for the position detection section 600 to extract the pointing element area and the shadow area using two taken images out of the N images, and detect the position of the pointing element 80 with respect to the operation surface SS using the relationship between the pointing element area and the shadow area. According also to this configuration, it is possible to improve the detection accuracy of the position of the pointing element 80 with respect to the operation surface. It should be noted that it is possible for the position detection section 600 to extract the pointing element area and the shadow area using M sets of taken images each including two taken images selected out of the N images, defining M as an integer no smaller than 1 and no larger than {N(N−1)/2}, and detect the position of the pointing element 80 with respect to the operation surface SS using the relationship between the pointing element area and the shadow area.

The present disclosure is not limited to the embodiments described above, but can be implemented in a variety of aspects within the scope or the spirit of the disclosure. For example, the present disclosure can also be implemented in the following aspects. The technical features in each of the embodiments described above corresponding to the technical features in each of the aspects described below can arbitrarily be replaced or combined in order to solve a part or the whole of the problem of the present disclosure, or to achieve some or all of the advantages of the present disclosure. Further, the technical feature can arbitrarily be eliminated unless described in the present specification as an essential element.

(1) According to a first aspect of the present disclosure, there is provided a position detection method of detecting a position of a pointing element with respect to an operation surface. The position detection method includes the steps of (a) obtaining a first taken image by imaging the pointing element with the operation surface as a background using a monocular camera while performing illumination with a first illumination section without performing the illumination with a second illumination section disposed at a position different from a position of the first illumination section, (b) obtaining a second taken image by imaging the pointing element with the operation surface as the background using the monocular camera while performing the illumination with the second illumination section without performing the illumination with the first illumination section, (c) extracting a pointing element area as an area of the pointing element including a tip part of the pointing element and a shadow area as an area of a shadow of the pointing element from the first taken image and the second taken image obtained with the monocular camera, and (d) detecting a position of the pointing element with respect to the operation surface using a relationship between the pointing element area and the shadow area.

According to this position detection method, by lighting the first illumination section and the second illumination section at exclusive timings, it is possible to obtain the first taken image and the second taken image the same in the pointing element area and different in the shadow area. Therefore, it is possible to accurately extract the pointing element area and the shadow area using the first taken image and the second taken image. Therefore, it is possible to accurately detect the position of the pointing element with respect to the operation surface using the relationship between the pointing element area and the shadow area.

(2) In the aspect described above, in the step (d), when the pointing element area and the shadow area are contiguous with each other, it may be determined that the pointing element has contact with the operation surface.

According to this position detection method, since the pointing element overlaps the shadow in the taken image obtained using the monocular camera when the pointing element has contact with the operation surface, it is possible to accurately determine whether or not the pointing element has contact with the operation surface based on whether or not the pointing element area and the shadow area are contiguous with each other. Further, it is possible to determine whether or not the pointing element has contact with the operation surface without measuring the three-dimensional position of the pointing element.

(3) In the aspect described above, in the step (d), when the shortest distance between the pointing element area and the shadow area is no larger than a predetermined threshold value, it may be determined that the pointing element has contact with the operation surface.

According to this position detection method, since the pointing element and the shadow are separated from each other in the taken image obtained using the monocular camera when the pointing element is separated from the operation surface, it is possible to accurately determine whether or not the pointing element has contact with the operation surface using the shortest distance between the pointing element area and the shadow area. Further, it is possible to determine whether or not the pointing element has contact with the operation surface without measuring the three-dimensional position of the pointing element.

(4) In the aspect described above, in the step (d), an area of the pointing element area in an interested area including a tip part of the pointing element in one of the first taken image and the second taken image, and an area of the shadow area in the interested area may be calculated, and when a value of a ratio of the area of the pointing element area to the area of the shadow area is no lower than a predetermined threshold value, it may be determined that the pointing element has contact with the operation surface.

According to this position detection method, since the shorter the distance between the pointing element and the operation surface becomes, the more the pointing element overlaps the shadow, and thus, the higher the value of the ratio of the area of the pointing element area to the area of the shadow area, it is possible to accurately determine whether or not the pointing element has contact with the operation surface using the value of the ratio of the area of the pointing element area to the area of the shadow area. Further, it is possible to determine whether or not the pointing element has contact with the operation surface without measuring the three-dimensional position of the pointing element.

(5) In the aspect described above, the first illumination section may include at least one of a coaxial illumination section configured to perform coaxial illumination to the monocular camera and an ambient illumination section disposed so as to surround periphery of an optical axis of the monocular camera.

According to this position detection method, since the first taken image does not substantially include the shadow of the pointing element, it is possible to accurately extract the pointing element area from the first taken image.

(6) According to a second aspect of the present disclosure, there is provided a position detection device configured to detect a position of a pointing element with respect to an operation surface. The position detection device includes an imaging section including a monocular camera configured to take an image of the pointing element with the operation surface as a background, an illumination section including a first illumination section and a second illumination section disposed at a position different from a position of the first illumination section, an imaging control section configured to obtain a first taken image by performing imaging of the pointing element with the operation surface as the background using the monocular camera while performing illumination with the first illumination section without performing the illumination with the second illumination section, and obtain a second taken image at a different timing from a timing of the first taken image by performing imaging of the pointing element with the operation surface as the background using the monocular camera while performing the illumination with the second illumination section without performing the illumination with the first illumination section, an area extraction section configured to extract a pointing element area as an area of the pointing element including a tip part of the pointing element and a shadow area as an area of a shadow of the pointing element from the first taken image and the second taken image, and a position detection section configured to detect a position of the pointing element with respect to the operation surface using a relationship between the pointing element area and the shadow area.

According to this position detection device, by lighting the first illumination section and the second illumination section at exclusive timings, it is possible to obtain the first taken image and the second taken image the same in the pointing element area and different in the shadow area. Therefore, it is possible to accurately extract the pointing element area and the shadow area using the first taken image and the second taken image. Therefore, it is possible to accurately detect the position of the pointing element with respect to the operation surface using the relationship between the pointing element area and the shadow area.

(7) In the aspect described above, when the pointing element area and the shadow area are contiguous with each other, the position detection section may determine that the pointing element has contact with the operation surface.

According to this position detection device, since the pointing element overlaps the shadow in the taken image obtained using the monocular camera when the pointing element has contact with the operation surface, it is possible to accurately determine whether or not the pointing element has contact with the operation surface based on whether or not the pointing element area and the shadow area are contiguous with each other. Further, it is possible to determine whether or not the pointing element has contact with the operation surface without measuring the three-dimensional position of the pointing element.

(8) In the aspect described above, when the shortest distance between the pointing element area and the shadow area is no larger than a predetermined threshold value, the position detection section may determine that the pointing element has contact with the operation surface.

According to this position detection device, since the pointing element and the shadow are separated from each other in the taken image obtained using the monocular camera when the pointing element is separated from the operation surface, it is possible to accurately determine whether or not the pointing element has contact with the operation surface using the shortest distance between the pointing element area and the shadow area. Further, it is possible to determine whether or not the pointing element has contact with the operation surface without measuring the three-dimensional position of the pointing element.

(9) In the aspect described above, the position detection section may calculate an area of the pointing element area in an interested area including a tip part of the pointing element in one of the first taken image and the second taken image, and an area of the shadow area in the interested area, and may determine that the pointing element has contact with the operation surface when a value of a ratio of the area of the pointing element area to the area of the shadow area is no lower than a predetermined threshold value.

According to this position detection device, since the shorter the distance between the pointing element and the operation surface becomes, the more the pointing element overlaps the shadow, and thus, the higher the value of the ratio of the area of the pointing element area to the area of the shadow area, it is possible to accurately determine whether or not the pointing element has contact with the operation surface using the value of the ratio of the area of the pointing element area to the area of the shadow area. Further, it is possible to determine whether or not the pointing element has contact with the operation surface without measuring the three-dimensional position of the pointing element.

(10) In the aspect described above, the first illumination section may include at least one of a coaxial illumination section configured to perform coaxial illumination to the monocular camera and an ambient illumination section disposed so as to surround periphery of an optical axis of the monocular camera.

According to this position detection device, since the first taken image does not substantially include the shadow of the pointing element, it is possible to accurately extract the pointing element area from the first taken image.

(11) According to a third aspect of the present disclosure, there is provided an interactive projector configured to detect a position of a pointing element with respect to an operation surface. The interactive projector includes a projection section configured to project a projection image on the projection surface, an imaging section including a monocular camera configured to take an image of the pointing element with the operation surface as a background, an illumination section including a first illumination section and a second illumination section disposed at a position different from a position of the first illumination section, an imaging control section configured to select the first illumination section and the second illumination section in sequence, obtain a first taken image by performing imaging of the pointing element with the operation surface as a background using the monocular camera while performing illumination with the first illumination section without performing the illumination with the second illumination section, and obtain a second taken image at a different timing from a timing of the first taken image by performing imaging of the pointing element with the operation surface as the background using the monocular camera while performing the illumination with the second illumination section without performing the illumination with the first illumination section, an area extraction section configured to extract a pointing element area as an area of the pointing element including a tip part of the pointing element and a shadow area as an area of a shadow of the pointing element from the first taken image and the second taken image, and a position detection section configured to detect a position of the pointing element with respect to the operation surface using a relationship between the pointing element area and the shadow area.

According to this interactive projector, by lighting the first illumination section and the second illumination section at exclusive timings, it is possible to obtain the first taken image and the second taken image the same in the pointing element area and different in the shadow area. Therefore, it is possible to accurately extract the pointing element area and the shadow area using the first taken image and the second taken image. Therefore, it is possible to accurately detect the position of the pointing element with respect to the operation surface using the relationship between the pointing element area and the shadow area.

What is claimed is:

1. A position detection method of detecting a position of a pointing element with respect to an operation surface, the method comprising:
    (a) obtaining a first taken image by imaging the pointing element with the operation surface as a background using a monocular camera while performing illumination with a first illumination section without performing the illumination with a second illumination section disposed at a position different from a position of the first illumination section;
    (b) obtaining a second taken image by imaging the pointing element with the operation surface as the background using the monocular camera while performing the illumination with the second illumination section without performing the illumination with the first illumination section, the first taken image including a first image of the pointing element and not including an image of a shadow of the point element, the second taken image including a second image of the pointing element and an image of a shadow of the point element;
    (c) extracting a pointing element area from the first taken image, the pointing element area being an area of the first image of the pointing element including a tip part of the pointing element without a shadow of the pointing element, comparing the first taken image and the second image, and extracting a shadow area as an area of the shadow of the pointing element in the second taken image based on a difference between the first taken image and the second taken image obtained with the monocular camera; and
    (d) detecting a position of the pointing element with respect to the operation surface using a relationship between the pointing element area and the shadow area.

2. The position detection method according to claim 1, wherein
    in the step (d), when the pointing element area and the shadow area are contiguous with each other, it is determined that the pointing element has contact with the operation surface.

3. The position detection method according to claim 1, wherein
    in the step (d), when the shortest distance between the pointing element area and the shadow area is no larger than a predetermined threshold value, it is determined that the pointing element has contact with the operation surface.

4. The position detection method according to claim 1, wherein
    in the step (d),
        an area of the pointing element area in an interested area including a tip part of the pointing element in one of the first taken image and the second taken image, and an area of the shadow area in the interested area are calculated, and
        when a value of a ratio of the area of the pointing element area to the area of the shadow area is no lower than a predetermined threshold value, it is determined that the pointing element has contact with the operation surface.

5. The position detection method according to claim 1, wherein
    the first illumination section includes at least one of a coaxial illumination section configured to perform coaxial illumination to the monocular camera and an ambient illumination section disposed so as to surround periphery of an optical axis of the monocular camera.

6. A position detection device configured to detect a position of a pointing element with respect to an operation surface, comprising:
    an imaging section including a monocular camera configured to take an image of the pointing element with the operation surface as a background;
    an illumination section including a first illumination section and a second illumination section disposed at a position different from a position of the first illumination section;
    an imaging control section configured to obtain a first taken image by performing imaging of the pointing element with the operation surface as the background using the monocular camera while performing illumination with the first illumination section without performing the illumination with the second illumination section, and obtain a second taken image at a different timing from a timing of the first taken image by performing imaging of the pointing element with the operation surface as the background using the monocular camera while performing the illumination with the second illumination section without performing the illumination with the first illumination section, the first taken image including a first image of the pointing element and not including an image of a shadow of the point element, the second taken image including a second image of the pointing element and an image of a shadow of the point element;

an area extraction section configured to extract a pointing element area from the first taken image, the pointing element area being an area of the first image of the pointing element including a tip part of the pointing element without a shadow of the pointing element, to compare the first taken image and the second image, and to extract a shadow area as an area of the shadow of the pointing element in the second taken image based on a difference between the first taken image and the second taken image; and a position detection section configured to detect a position of the pointing element with respect to the operation surface using a relationship between the pointing element area and the shadow area.

7. The position detection device according to claim 6, wherein when the pointing element area and the shadow area are contiguous with each other, the position detection section determines that the pointing element has contact with the operation surface.

8. The position detection device according to claim 6, wherein when the shortest distance between the pointing element area and the shadow area is no larger than a predetermined threshold value, the position detection section determines that the pointing element has contact with the operation surface.

9. The position detection device according to claim 6, wherein the position detection section calculates an area of the pointing element area in an interested area including a tip part of the pointing element in one of the first taken image and the second taken image, and an area of the shadow area in the interested area, and determines that the pointing element has contact with the operation surface when a value of a ratio of the area of the pointing element area to the area of the shadow area is no lower than a predetermined threshold value.

10. The position detection device according to claim 6, wherein the first illumination section includes at least one of a coaxial illumination section configured to perform coaxial illumination to the monocular camera and an ambient illumination section disposed so as to surround periphery of an optical axis of the monocular camera.

11. An interactive projector configured to detect a position of a pointing element with respect to an operation surface, comprising:

a projection section configured to project a projection image on the projection surface;

an imaging section including a monocular camera configured to take an image of the pointing element with the operation surface as a background;

an illumination section including a first illumination section and a second illumination section disposed at a position different from a position of the first illumination section;

an imaging control section configured to select the first illumination section and the second illumination section in sequence, obtain a first taken image by performing imaging of the pointing element with the operation surface as a background using the monocular camera while performing illumination with the first illumination section without performing the illumination with the second illumination section, and obtain a second taken image at a different timing from a timing of the first taken image by performing imaging of the pointing element with the operation surface as the background using the monocular camera while performing the illumination with the second illumination section without performing the illumination with the first illumination section, the first taken image including a first image of the pointing element and not including an image of a shadow of the point element, the second taken image including a second image of the pointing element and an image of a shadow of the point element;

an area extraction section configured to extract a pointing element area from the first taken image, the pointing element area being an area of the first image of the pointing element including a tip part of the pointing element without a shadow of the pointing element, to compare the first taken image and the second image, and to extract a shadow area as an area of the shadow of the pointing element in the second taken image based on a difference between the first taken image and the second taken image; and a position detection section configured to detect a position of the pointing element with respect to the operation surface using a relationship between the pointing element area and the shadow area.

* * * * *